US011178643B2

(12) United States Patent
Yuan et al.

(10) Patent No.: US 11,178,643 B2
(45) Date of Patent: Nov. 16, 2021

(54) SYSTEM AND METHOD FOR ALLOCATING NETWORK RESOURCE

(71) Applicant: ZTE CORPORATION, Guangdong (CN)

(72) Inventors: Zhifeng Yuan, Guangdong (CN); Xun Yang, Guangdong (CN); Weimin Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/745,165

(22) Filed: Jan. 16, 2020

(65) Prior Publication Data

US 2020/0154405 A1 May 14, 2020

Related U.S. Application Data

(63) Continuation of application No. PCT/CN2017/093919, filed on Jul. 21, 2017.

(51) Int. Cl.
*H04W 4/00* (2018.01)
*H04W 72/04* (2009.01)
*H04B 1/7143* (2011.01)
*H04L 5/00* (2006.01)

(52) U.S. Cl.
CPC .......... *H04W 72/04* (2013.01); *H04B 1/7143* (2013.01); *H04L 5/0012* (2013.01)

(58) Field of Classification Search
CPC ............... H04W 72/042; H04W 76/27; H04W 72/0446; H04W 72/04; H04L 5/0053; H04L 1/1812; H04L 5/0012; H04B 1/7143

See application file for complete search history.

(56) References Cited

U.S. PATENT DOCUMENTS

| 2006/0013285 A1* | 1/2006 | Kobayashi | H04L 5/023 375/132 |
| 2008/0247336 A1* | 10/2008 | Sugitani | H04B 7/2643 370/280 |
| 2009/0086791 A1* | 4/2009 | Bienas | H04L 5/0039 375/132 |
| 2010/0183048 A1* | 7/2010 | Hamamura | H04B 1/7143 375/130 |
| 2012/0113967 A1* | 5/2012 | Smith | H04L 27/2613 370/338 |

(Continued)

FOREIGN PATENT DOCUMENTS

| CN | 101384065 A | 3/2009 |
| CN | 106160815 A | 11/2016 |
| WO | 2015184917 A1 | 12/2015 |

*Primary Examiner* — Atique Ahmed
(74) *Attorney, Agent, or Firm* — Duane Morris LLP

(57) ABSTRACT

A system and method for allocating network resources are disclosed herein. In one embodiment, the system and method are configured to perform: transmitting a resource allocation signal to a communication node, the resource allocation signal indicating an updated resource hopping rule for the communication node to transmit a signal, wherein the updated resource hopping rule is derived based on an initial resource hopping rule by adjusting a time period defined by the initial resource hopping rule or rearranging at least two resource columns defined by the initial resource hopping rule.

20 Claims, 39 Drawing Sheets

(56) References Cited

U.S. PATENT DOCUMENTS

2012/0250790 A1* 10/2012 Yang .................... H03F 3/189
375/296
2015/0327315 A1* 11/2015 Xue ..................... H04L 5/0005
370/330
2015/0333792 A1   11/2015 Kwon et al.

* cited by examiner

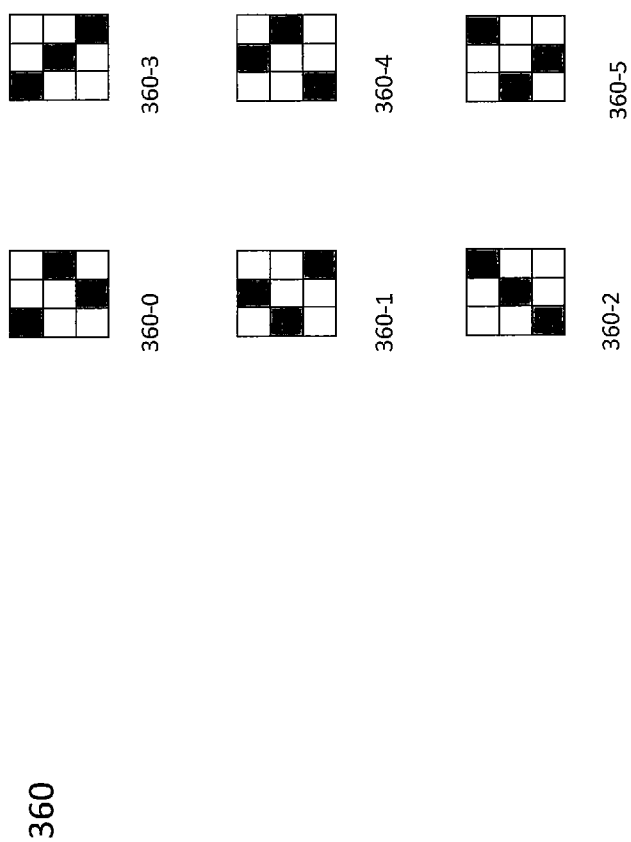

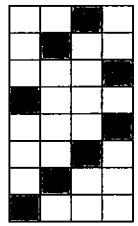 520-8
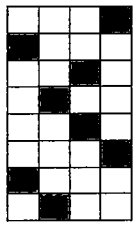 520-9
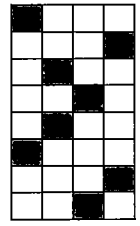 520-10
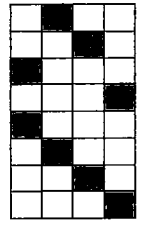 520-11
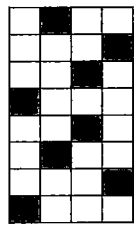 520-4
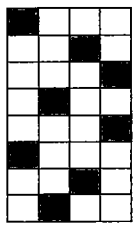 520-5
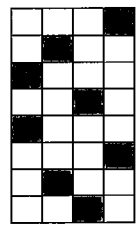 520-6
520-7
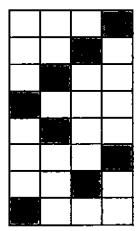 520-0
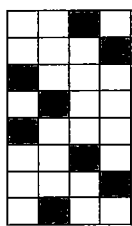 520-1
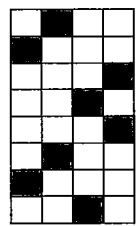 520-2
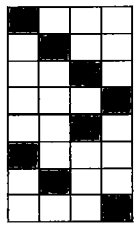 520-3
520
Figure 5B

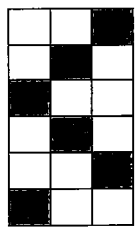
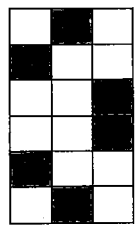
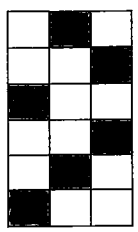
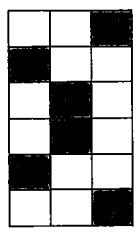
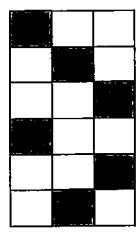
Figure 5D

 660-0
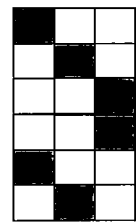 660-1
 660-2
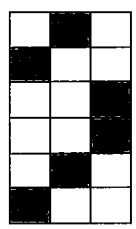 660-3
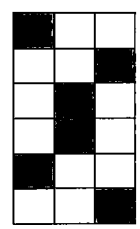 660-4
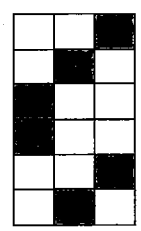 660-5
660
Figure 6D

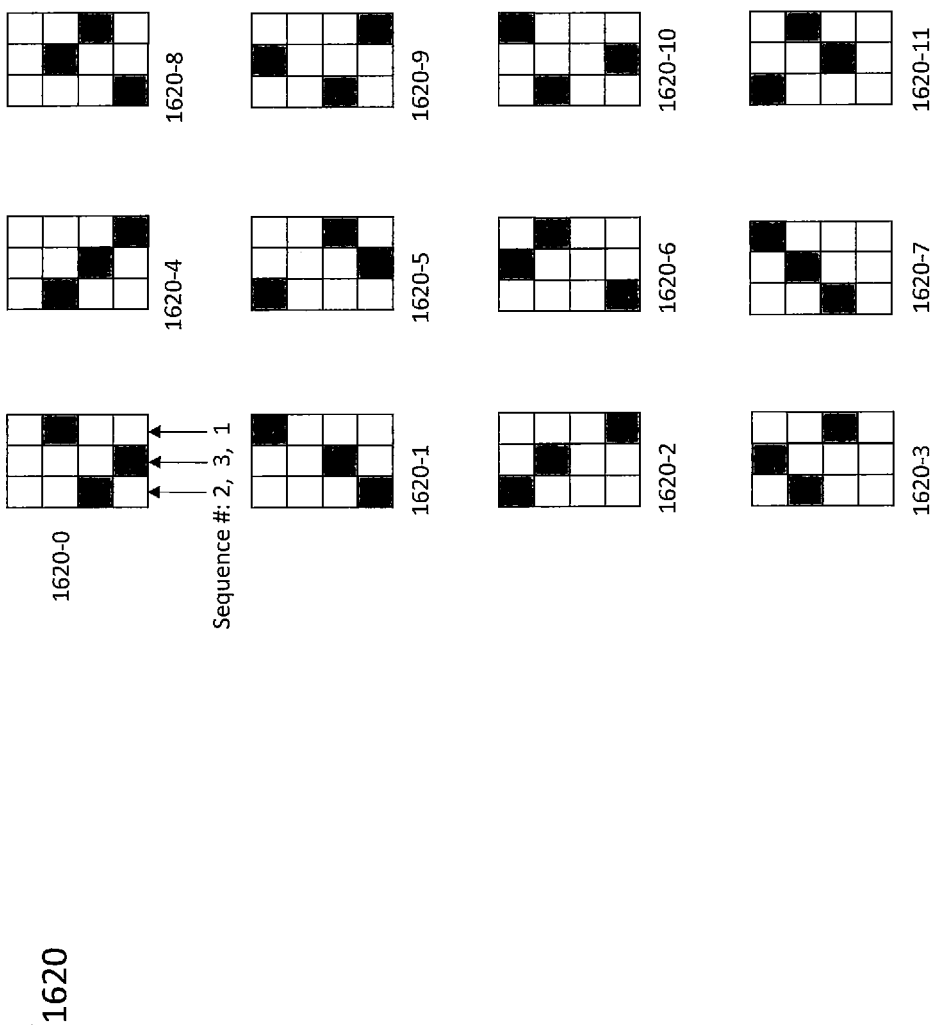

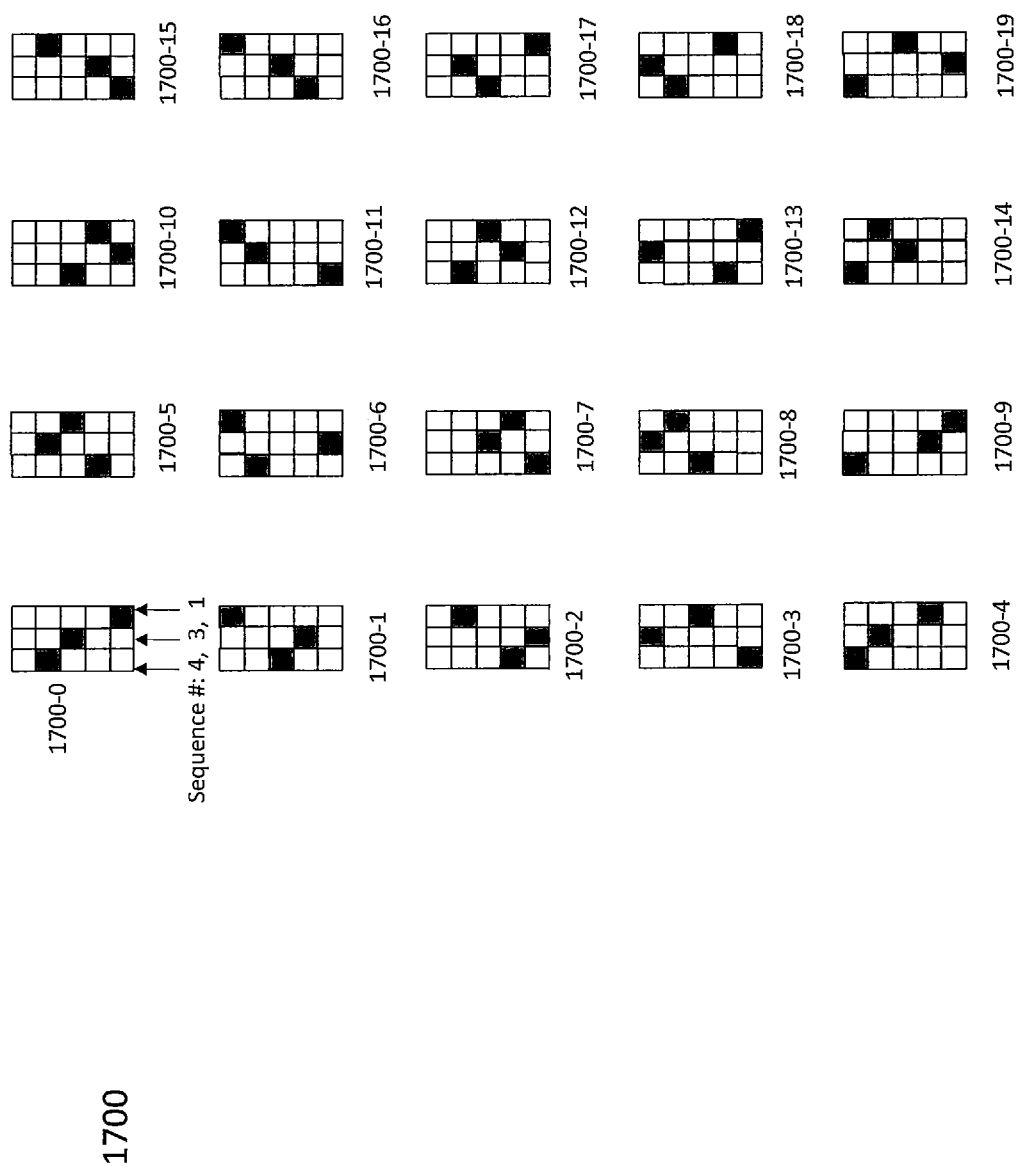

903

| 1 | 3 | 5 | 7 | 9 | 11 | 0 | 2 | 4 | 6 | 8 | 10 |
|---|---|---|---|---|---|---|---|---|---|---|---|

$a_m$ $$m = \begin{cases} \mod(2n+1, N) & 0 \le n \le 5 \\ \mod(2n+2, N) & 6 \le n \le 11 \end{cases}$$

905

| 1 | 4 | 7 | 10 | 2 | 5 | 8 | 11 | 0 | 3 | 6 | 9 |
|---|---|---|---|---|---|---|---|---|---|---|---|

$a_m$ $$m = \begin{cases} \mod(3n+1, N) & 0 \le n \le 3 \\ \mod(3n+2, N) & 4 \le n \le 7 \\ \mod(3n+0, N) & 8 \le n \le 11 \end{cases}$$

907

| 1 | 5 | 9 | 2 | 6 | 10 | 3 | 7 | 11 | 0 | 4 | 8 |
|---|---|---|---|---|---|---|---|---|---|---|---|

$a_m$ $$m = \begin{cases} \mod(4n+1, N) & 0 \le n \le 2 \\ \mod(4n+2, N) & 3 \le n \le 5 \\ \mod(4n+3, N) & 6 \le n \le 8 \\ \mod(4n+0, N) & 9 \le n \le 11 \end{cases}$$

909

| 1 | 6 | 11 | 4 | 9 | 2 | 7 | 0 | 5 | 10 | 3 | 8 |
|---|---|---|---|---|---|---|---|---|---|---|---|

$a_m$ $m = \mod(5n+1, N)$

911

| 1 | 8 | 3 | 10 | 5 | 0 | 7 | 2 | 9 | 4 | 11 | 6 |
|---|---|---|---|---|---|---|---|---|---|---|---|

$a_m$ $m = \mod(7n+1, N)$

Figure 19C

SYSTEM AND METHOD FOR ALLOCATING NETWORK RESOURCE

TECHNICAL FIELD

The disclosure relates generally to wireless communications and, more particularly, to systems and methods to allocate network resource.

BACKGROUND

Wireless communication systems are widely deployed to provide various communication content such as voice, video, packet data, messaging, broadcast, etc. These wireless systems may be multiple-access systems capable of supporting multiple users by sharing available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations (BSs) that each can support communication for a number of user equipment devices (UEs). A UE may communicate with a BS via plural downlink and uplink channels, as known by persons of ordinary skill in the art. The wireless communication system may operate with a configurable, yet limited, system resource. Although it is desired to simultaneously support communication for as many UEs as possible while maintaining acceptable data transmission rates, due to the limited system resource, the system resource is typically divided into a plurality of resource units across time and frequency domains. Such a resource unit is also known as a segment, a set of time frequency blocks, a set of resource blocks, a tile, etc. In general, each UE is assigned with a pre-defined set of such resource units, which is typically known as a hopping pattern.

When used in a 5th generation (5G) communication system, however, existing hopping patterns may encounter various issues, for example, an increased probability of collision (i.e., two or more UEs using a same resource unit), partially because, in the 5G communication system, various communication demands for respective applications (e.g., Internet of Things (IoT), massive Machine Type Communication (mMTC), etc.), are emerging. Thus, existing systems and methods to provide hopping patterns are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: transmitting a resource allocation signal to a communication node, the resource allocation signal indicating an updated resource hopping rule for the communication node to transmit a signal, wherein the updated resource hopping rule is derived based on an initial resource hopping rule by adjusting a time period defined by the initial resource hopping rule.

In a further embodiment, a method includes: receiving, by a communication node, a resource allocation signal indicating an updated resource hopping rule for the communication node to transmit a signal, wherein the updated resource hopping rule is derived based on an initial resource hopping rule by adjusting a time period defined by the initial resource hopping rule.

In another embodiment, a communication node includes: a transmitter configured to transmit a resource allocation signal to a communication node, the resource allocation signal indicating an updated resource hopping rule for the communication node to transmit a signal; and at least one processor, coupled to the transmitter, and configured to derive the updated resource hopping rule by adjusting a time period defined by an initial resource hopping rule.

In yet another embodiment, a communication node includes: a receiver configured to receive a resource allocation signal indicating an updated resource hopping rule for the communication node to transmit a signal, wherein the updated resource hopping rule is derived based on an initial resource hopping rule by adjusting a time period defined by the initial resource hopping rule.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

FIGS. 3A, 3B, 3C, and 3D illustrate various exemplary sets of pre-defined resource hopping patterns, in accordance with some embodiments of the present disclosure.

FIGS. 5A, 5B, 5C, 5D, 6A, 6B, 6C, 6D, 7A, and 7B illustrate various exemplary sets of updated resource hopping patterns generated based on a elongating method, in accordance with some embodiments of the present disclosure.

FIGS. 13A, 13B, 14A, 14B, 15A, 15B, 16A, 16B, 17, and 18 illustrate various exemplary sets of updated resource hopping patterns generated based on a shortening method, in accordance with some embodiments of the present disclosure.

FIGS. 19A, 19B, 19C, and 19D illustrate various exemplary symbolic diagrams to explain respective permutation methods of the elongating method, in accordance with some embodiments of the present disclosure.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
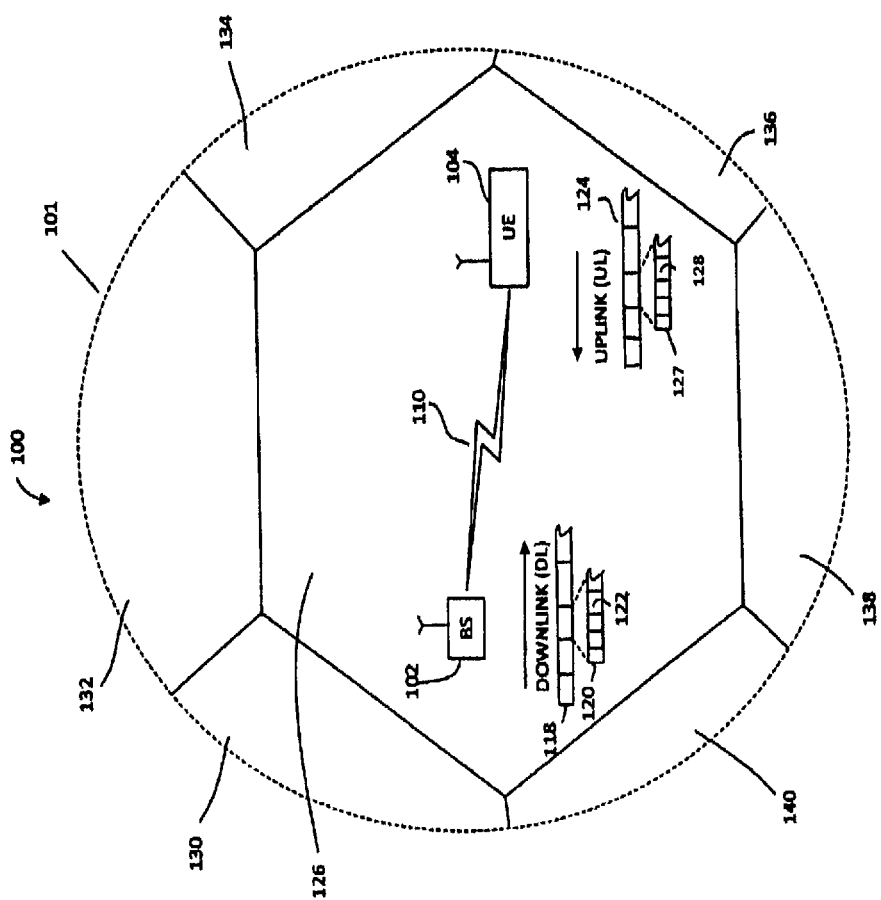
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. In the following discussion, the wireless communication network 100 may be a NB-IoT network, which is herein referred to as "network 100." Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
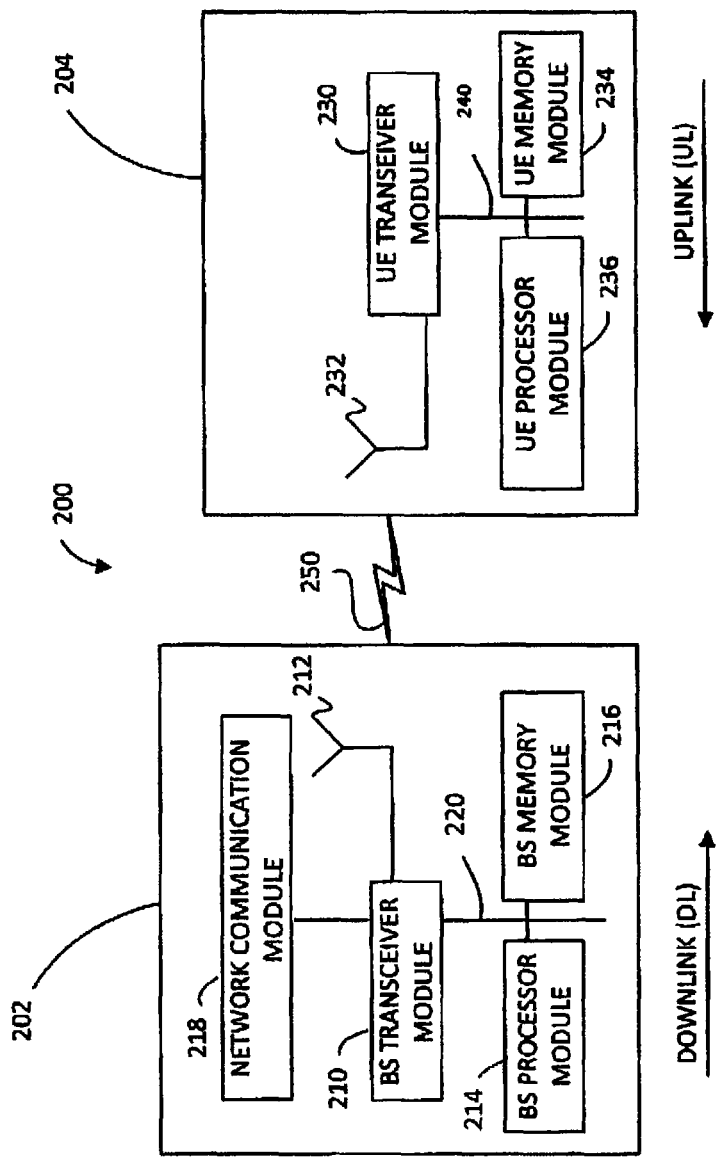
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, when the UE 104 camps on the cell 126 of the BS 102 to start communication with the BS 102 (e.g., transmitting uplink signals), the UE 104 uses an assigned set of resource units to transmit such uplink signals. The set of resource units is defined by a resource hopping pattern assigned for the UE 104. More specifically, each resource unit occupies a time interval (e.g., a time frame or a sub-frame) along a time domain and a frequency interval (e.g., a carrier or a sub-carrier) along a frequency domain, that is, occupying a respective time/frequency location. As such, following the resource hopping pattern that defines respective time/frequency locations of the resource units, the UE 104 may use an assigned carrier, or sub-carrier, during an assigned time frame, or sub-frame, to transmit the uplink signals. Analogously, when other UEs camp on the cell 126, each of the other UEs uses a respective set of resource units, defined by an assigned resource hopping pattern, to transmit respective uplink signals. As mentioned above, using existing resource hopping patterns has caused various issues when various communication demands are emerging in the 5G communication system.

The present disclosure provides various embodiments of systems and methods to provide a novel resource hopping pattern based on elongating, shortening, and/or rearranging a pre-defined resource hopping pattern. In some embodiments, the pre-defined resource hopping pattern may be one of a set of pre-defined resource hopping patterns defined based on a Latin square. By using at least one of such elongating, shortening, and rearranging methods on the set of pre-defined resource hopping patterns, a set of novel resource hopping patterns can be corresponding generated. Each of the elongating, shortening, and rearranging methods may generate a respective set of novel resource hopping patterns that is suitable for a respective scenario. As such, the set of novel resource hopping patterns may be more flexible to suit for various communication demands in the 5G communication system.

As mentioned above, the set of pre-defined resource hopping patterns, which is subsequently modified by the disclosed methods, is defined based on the Latin square. Generally, an N×N Latin square is a table filled with N different elements (or numeric values) such that each element occurs only once in each column and only once in each row of the table. Such an N×N Latin square may be systematically generated using a sequence of 0 through N−1 for a first row and using this sequence cyclically shifted by n for an n-th row, wherein n is selected from a value between 0 and N−1. The Latin square may also be generated based on other permutations of the N different elements.

FIGS. 3A, 3B, 3C, and 3D illustrates exemplary sets (300, 320, 340, and 360) of pre-defined resource hopping patterns, defined based on the Latin square, in accordance with some embodiments. The set 300 in FIG. 3A includes 16 pre-defined resource hopping patterns (300-0, 300-1, 300-2, 300-4, 300-5, 300-6, 300-7, 300-8, 300-9, 300-10, 300-11, 300-12, 300-13, 300-14, and 300-15), each of which has a time period of 4; the set 320 in FIG. 3B includes 12 pre-defined resource hopping patterns (320-0, 320-1, 320-2, 320-3, 320-4, 320-5, 320-6, 320-7, 320-8, 320-9, 320-10, and 320-11), each of which has a time period of 4; the set 340 in FIG. 3C includes 20 pre-defined resource hopping patterns (340-0, 340-1, 340-2, 340-4, 340-5, 340-6, 340-7, 340-8, 340-9, 340-10, 340-11, 340-12, 340-13, 340-14, 340-15, 340-16, 340-17, 340-18, and 340-19), each of which has a time period of 5; and set 360 in FIG. 3D includes 6 pre-defined resource hopping patterns (360-1, 360-2, 360-3, 360-4, and 360-5), each of which has a time period of 3. It is noted that each pre-defined resource hopping pattern is referenced by a pattern # (hereinafter "n") within a respective set. For example, the pattern # (n) of the pre-defined resource hopping pattern 300-0 is "0."

Figure 3A:
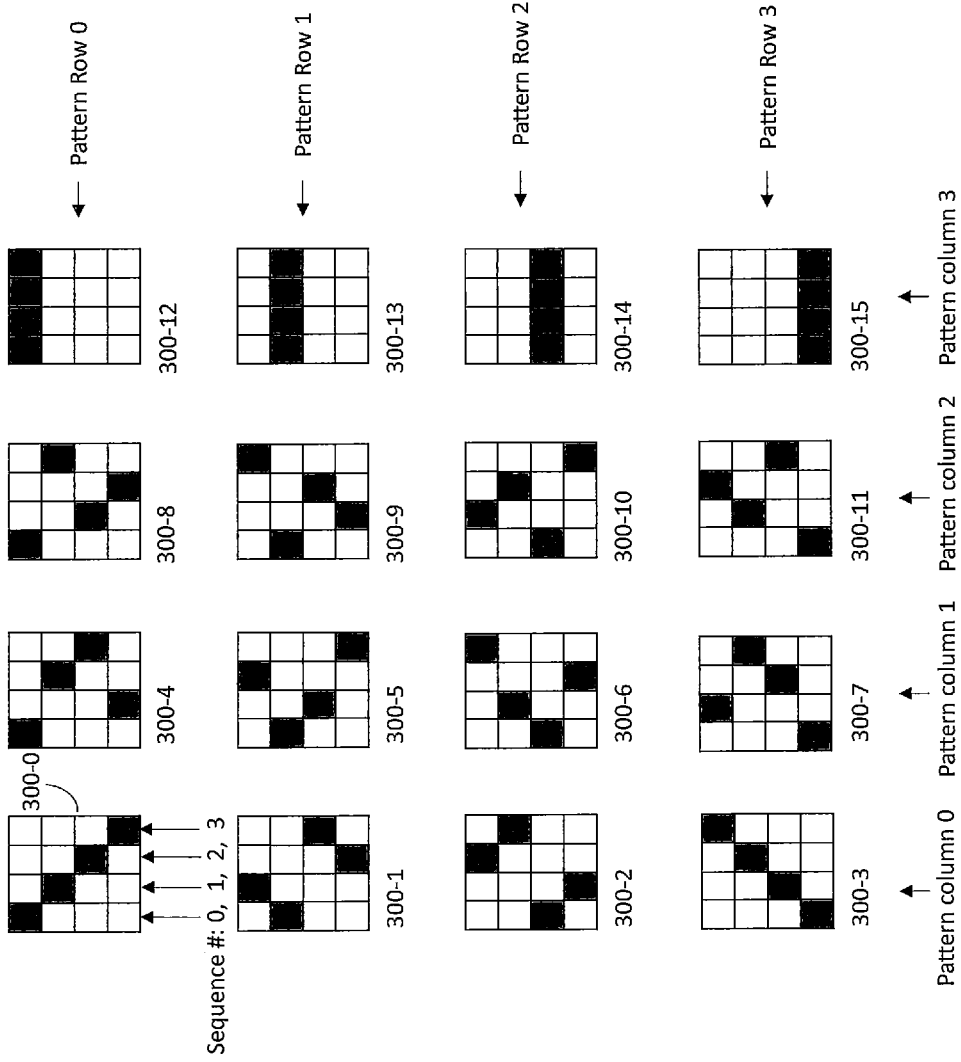

In some embodiments, the pre-defined resource hopping patterns in each set, for example, 300-0 to 300-15 of the set 300 in FIG. 3A, are arranged in a column-row configuration. More specifically, each pre-defined resource hopping pattern in the respective set can be located by a respective combination of a pattern column # (hereinafter "j") and a pattern row # (hereinafter "i"), or alternatively stated, located at an intersection of the respective pattern column j and pattern row i. For example, as shown in FIG. 3A, the pre-defined hopping pattern 300-0 is located at an intersection of pattern column 0 and pattern row 0, i.e., (j, i)=(0, 0); and the pre-defined hopping pattern 300-6 is located at an intersection of pattern column 1 and pattern row 2, i.e., (j, i)=(1, 2). For brevity, discussions of respective location configurations of other pre-defined hopping patterns in the set 300 are not repeated here. The sets 320, 340, and 360 are each arranged in a substantially similar configuration as the set 300, so that discussions of respective configurations of the sets 320, 340, and 360 are not repeated here.

As mentioned above, each pre-defined hopping pattern is defined by the Latin square (i.e., each element occurs only once in each column and only once in each row of the Latin square). And, in some embodiments, each pre-defined hopping pattern may define a respective set of resource units that can be assigned for a UE to use, hereinafter "assigned resource units." Accordingly, the assigned resource units may be each symbolically represented by a corresponding "element" of a respective Latin square. Further, each element in the respective Latin square occupies a respective time interval and a respective frequency interval, which allows the corresponding assigned resource unit to be referenced by respective time frame # and resource unit #, as will be discussed below.

Figure 4:
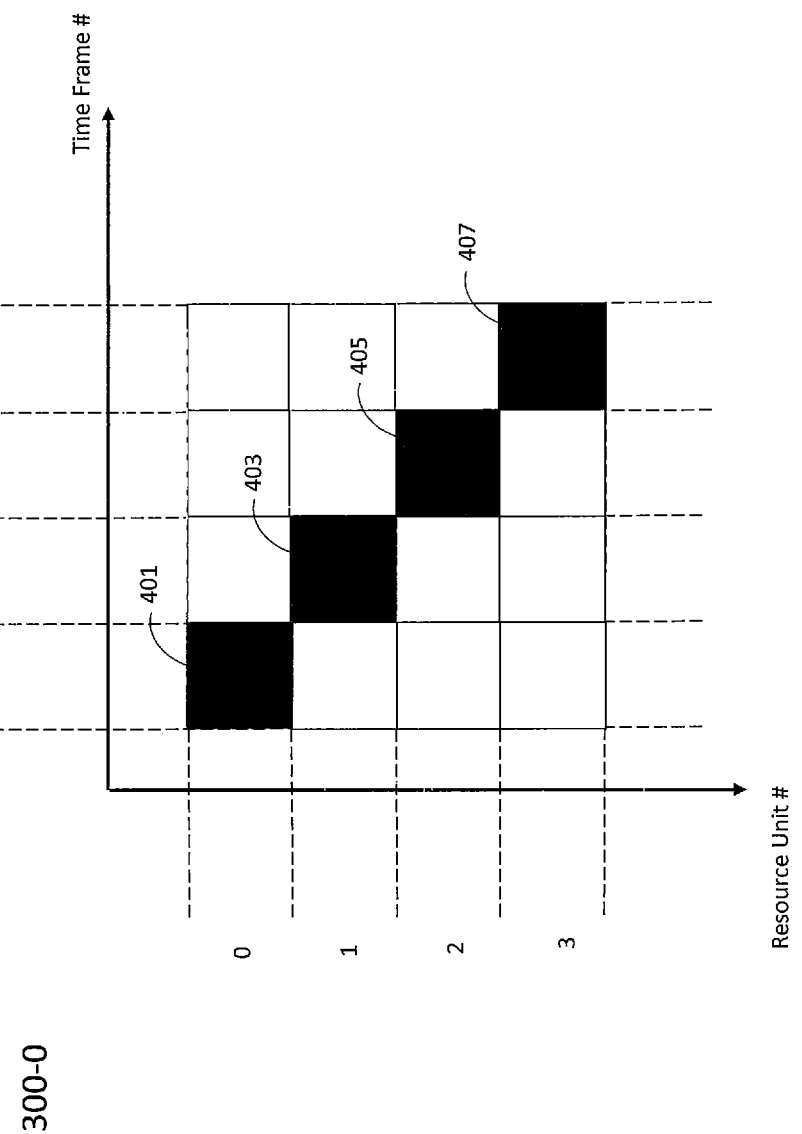
FIG. 4 illustrates an exemplary pre-defined resource hopping pattern of the set of FIG. 3A, in accordance with some embodiments of the present disclosure.

Taking the pre-defined hopping pattern 300-0 of the set 300 (FIG. 3A) for example, which is reproduced in FIG. 4, the pre-defined resource hopping pattern 300-0 has four "elements" 401, 403, 405, and 407 (filled with shade), as defined by the principle of the Latin square. Each of the elements 401-407 occupies a respective time interval along the time domain, which is referenced by a time frame #, and a respective frequency interval along the frequency domain, which is referenced by a resource unit #. In particular, when the pre-defined resource hopping pattern 300-0 is assigned to a UE, the element 401, occupying resource unit 0 and time frame 0, symbolically represents that the resource unit 0 can be used by the UE during the time frame 0; the element 403, occupying resource unit 1 and time frame 1, symbolically represents that the resource unit 1 can be used by the UE during the time frame 1; the element 405, occupying resource unit 2 and time frame 2, symbolically represents that the resource unit 2 can be used by the UE during the time frame 2; the element 407, occupying resource unit 3 and time frame 3, symbolically represents that the resource unit 3 can be used by the UE during the time frame 3.

In some embodiments, the pre-defined resource hopping pattern 300-0 may be repeatedly used by the UE to find assigned resource units. As such, subsequently to the time frame 3, the resource units 0, 1, 2, and 3 may be iteratively used during respective time frames, which corresponds to the time period of 4 of each of the pre-defined resource hopping patterns in the set 300 of FIG. 3A, as mentioned above. Similarly, the resource hopping patterns of each of the sets 320, 340, and 360 each has a respective time period, as mentioned above.

According to some embodiments of the present disclosure, each set of the pre-defined resource hopping patterns of FIGS. 3A-3D may be used as a basis to be modified by at least one of the disclosed elongating, shortening, and rearranging methods so as to generate a respective set of updated resource hopping patterns, which will be discussed in further detail below. Such sets of updated resource hopping patterns may be each used to allocate resource units for respective different communication nodes (e.g., the UE 104). The exemplary sets of the pre-defined resource hopping patterns of FIGS. 3A-3D are merely provided for illustration purposes, and thus, it is noted that a set of pre-defined resource hopping patterns with any desired time period and/or any desired number of pre-defined resource hopping patterns can be used for generating a corresponding set of updated resource hopping patterns while remaining within the scope of the present disclosure.

Embodiments of the Elongating Method

Some embodiments of the elongating method include combining a first one and a second one that are selected from a respective set of pre-defined resource hopping patterns to generate an updated resource hopping pattern. In accordance with some embodiments, such first and second pre-defined resource hopping patterns are combined along the time domain to generate the updated resource hopping pattern. As such, the updated resource hopping pattern may have an "elongated" time period, e.g., twice longer than a time period of the pre-defined resource hopping pattern. In some embodiments, the first and second pre-defined resource hopping patterns may be selected from a same pattern row of the set of pre-defined resource hopping patterns, from a same pattern column of the set of pre-defined resource hopping patterns, or from respective different pattern columns and rows of the set of pre-defined resource hopping patterns, each of which will be respectively discussed in further detail below. In some embodiments, regardless of how the first and second pre-defined resource hopping patterns are selected from the respective set of pre-defined resource hopping patterns to generate a corresponding updated resource hopping pattern, once one of the three selection principles is determined, such a selection principle is universally used across every pre-defined resource hopping pattern of the respective set so as to generate a corresponding set of updated resource hopping patterns.

Figure 3B:
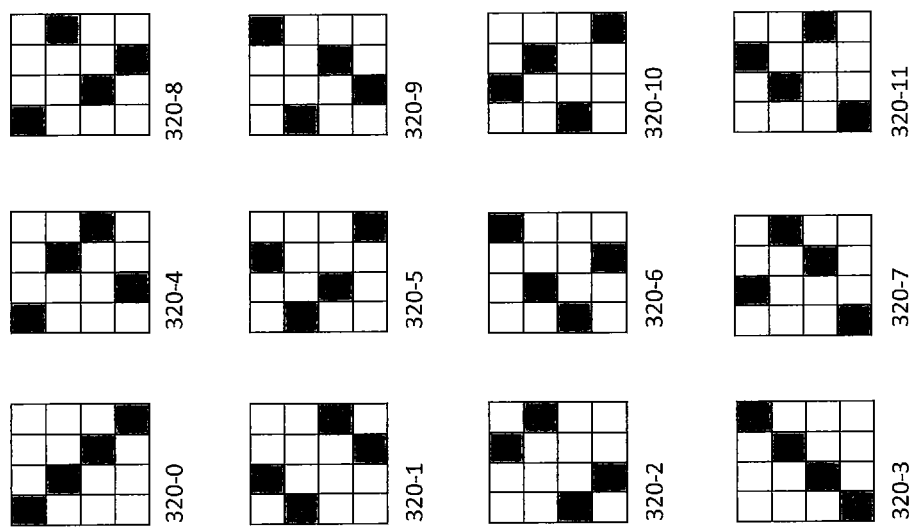
Figure 3C:
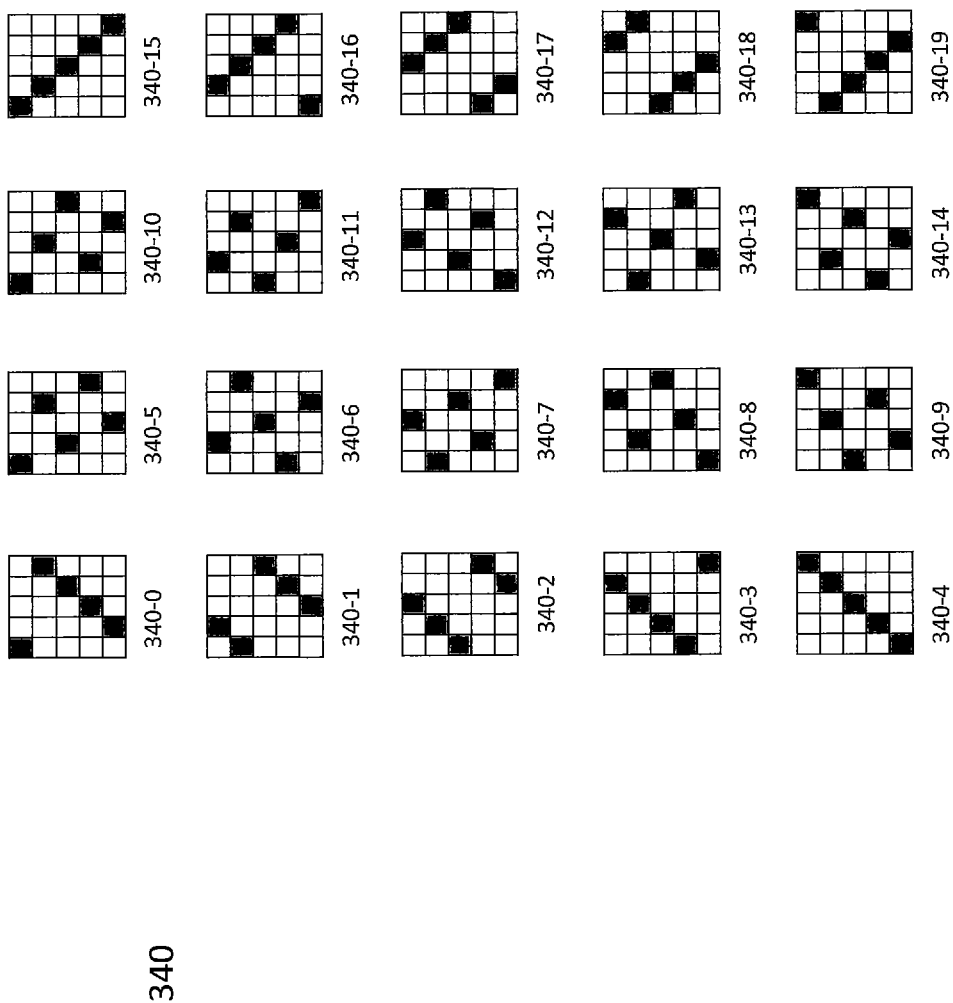

In accordance with the embodiment where the first and second pre-defined resource hopping patterns are selected from the same pattern row of the set of pre-defined resource hopping patterns, FIGS. 5A, 5B, 5C, and 5D provides exemplary sets 500, 520, 540, and 560 of updated resource hopping patterns generated from the set 300 of FIG. 3A, set 320 of FIG. 3B, set 340 of FIG. 3C, and set 360 of FIG. 3D, respectively. In some embodiments, the first pre-defined resource hopping pattern is along a first pattern column, associated with a first pattern column #, e.g., $j_1$, and the second pre-defined resource hopping pattern is along a second pattern column, associated with a second pattern column #, e.g., $j_2$. More specifically, $j_2$ is selected to be next closet to $j_1$ (e.g., $(j_2, j_1)=(1, 0), (2, 1), (3, 2),$ or $(0, 3)$), and the second pre-defined resource hopping pattern is coupled, along the time domain, to the first pre-defined resource hopping pattern to generate the updated resource hopping pattern. As such, the updated resource hopping pattern may be located at same pattern column # (j) and row # (i) as the first pre-defined resource hopping pattern, alternatively stated, sharing a same pattern # (n).

Figure 5A:
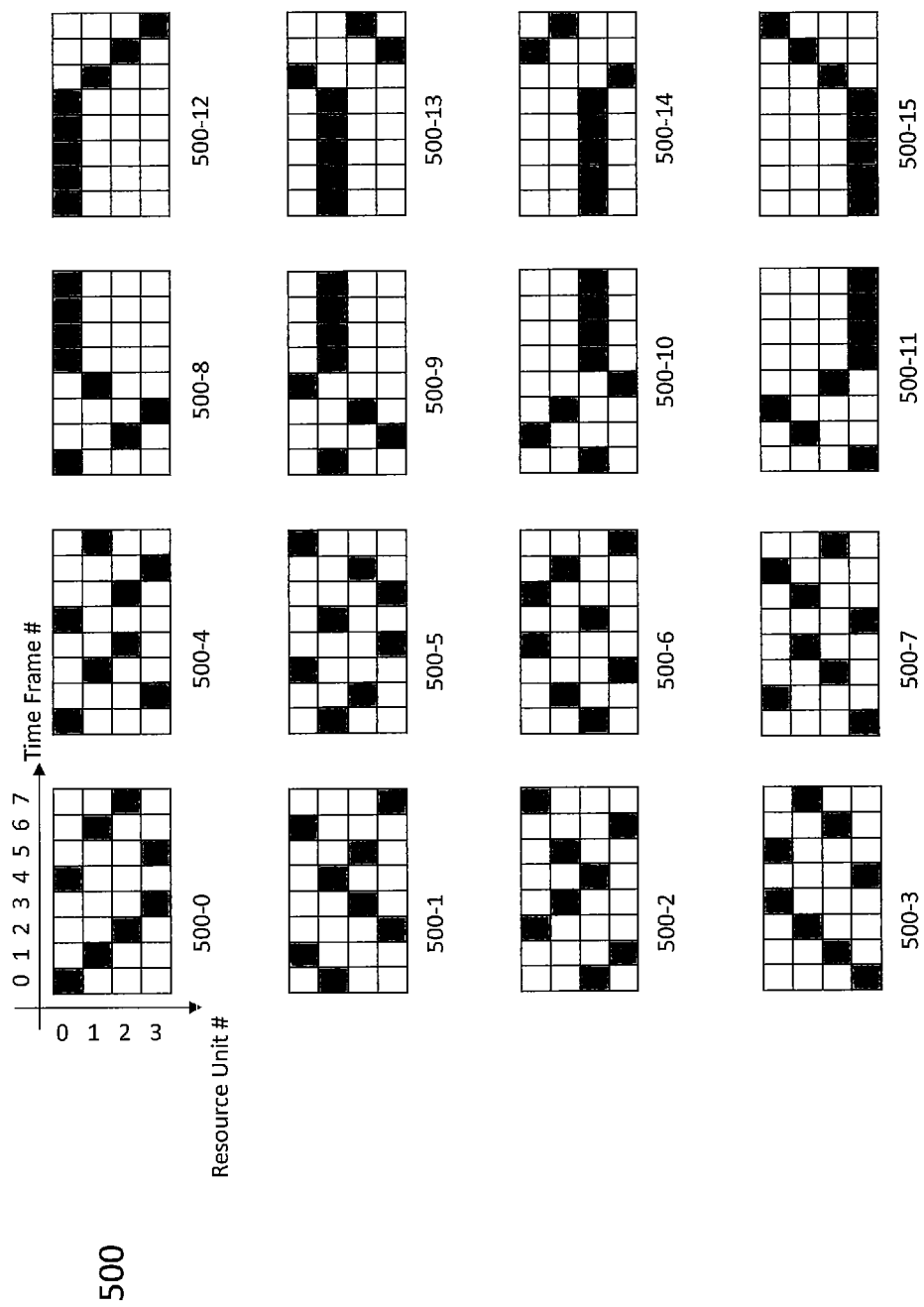
Figure 5C:
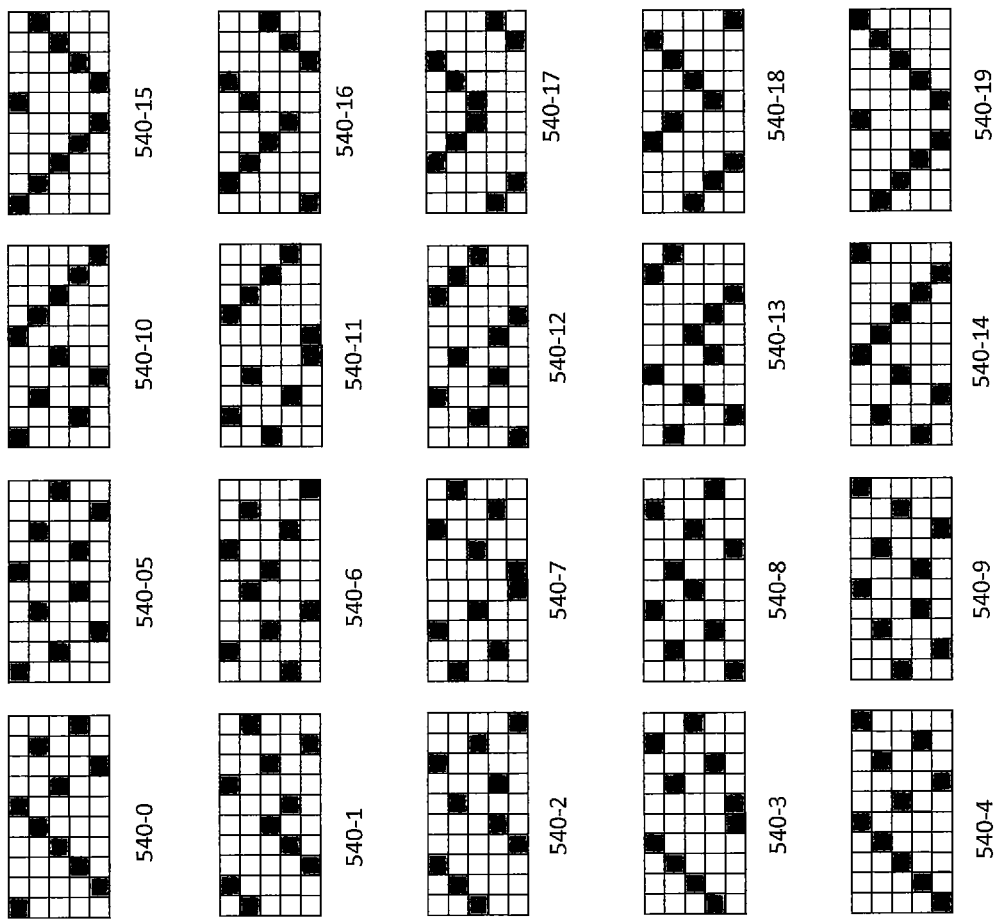

Referring first to FIG. 5A, the set 500 of updated resource hopping patterns, generated based on the set 300 of FIG. 3A, is shown. The set 500 includes updated resource hopping patterns: 500-0, 500-1, 500-2, 500-3, 500-4, 500-5, 500-6, 500-7, 500-8, 500-9, 500-10, 500-11, 500-12, 500-13, 500-14, and 500-15. According to the above-described principle, the updated resource hopping pattern 500-0 is generated by coupling the pre-defined resource hopping pattern 300-4 (a respective second pre-defined resource hopping pattern), along the time domain, to the pre-defined resource hopping pattern 300-0 (a respective first pre-defined resource hopping pattern). Similarly, the updated resource hopping pattern 500-1 is generated by coupling the pre-defined resource hopping pattern 300-5, along the time domain, to the pre-defined resource hopping pattern 300-1; the updated resource hopping pattern 500-2 is generated by coupling the pre-defined resource hopping pattern 300-6, along the time domain, to the pre-defined resource hopping pattern 300-2; the updated resource hopping pattern 500-3 is generated by coupling the pre-defined resource hopping pattern 300-7, along the time domain, to the pre-defined resource hopping pattern 300-3 along the time domain; the updated resource hopping pattern 500-4 is generated by coupling the pre-defined resource hopping pattern 300-8, along the time domain, to the pre-defined resource hopping pattern 300-4; the updated resource hopping pattern 500-5 is generated by coupling the pre-defined resource hopping pattern 300-9, along the time domain, to the pre-defined resource hopping pattern 300-5; the updated resource hopping pattern 500-6 is generated by coupling the pre-defined resource hopping pattern 300-10, along the time domain, to the pre-defined resource hopping pattern 300-6; the updated resource hopping pattern 500-7 is generated by coupling the pre-defined resource hopping pattern 300-11, along the time domain, to the pre-defined resource hopping pattern 300-7; the updated resource hopping pattern 500-8 is generated by coupling the pre-defined resource hopping pattern 300-12, along the time domain, to the pre-defined resource hopping pattern 300-8; the updated resource hopping pattern 500-9 is generated by coupling the pre-defined resource hopping pattern 300-13, along the time domain, to the pre-defined resource hopping pattern 300-9; the updated resource hopping pattern 500-10 is generated by coupling the pre-defined resource hopping pattern 300-14, along the time domain, to the pre-defined resource hopping pattern 300-10; the updated resource hopping pattern 500-11 is generated by coupling the pre-defined resource hopping pattern 300-15, along the time domain, to the pre-defined resource hopping pattern 300-11; the updated resource hopping pattern 500-12 is generated by coupling the pre-defined resource hopping pattern 300-0, along the time domain, to the pre-defined resource hopping pattern 300-12; the updated resource hopping pattern 500-13 is generated by coupling the pre-defined resource hopping pattern 300-1, along the time domain, to the pre-defined resource hopping pattern 300-13; the updated resource hopping pattern 500-14 is generated by coupling the pre-defined resource hopping pattern 300-2, along the time domain, to the pre-defined resource hopping pattern 300-14; and the updated resource hopping pattern 500-15 is generated by coupling the pre-defined resource hopping pattern 300-3, along the time domain, to the pre-defined resource hopping pattern 300-15.

Following the same combination principle, the set 520 (FIG. 5B), including updated resource hopping patterns: 520-0, 520-1, 520-2, 520-3, 520-4, 520-5, 520-6, 520-7, 520-8, 520-9, 520-10, and 520-11, can be similarly generated based on the set 320 of FIG. 3B; the set 540 (FIG. 5C), including updated resource hopping patterns: 540-0, 540-1, 540-2, 540-3, 540-4, 540-5, 540-6, 540-7, 540-8, 540-9, 540-10, 540-11, 540-12, 540-13, 540-14, 540-15, 540-16, 540-17, 540-18, and 540-19, can be similarly generated based on the set 340 of FIG. 3C; and the set 560 (FIG. 5D), including updated resource hopping patterns: 560-0, 560-1, 560-2, 560-3, 560-4, and 560-5, can be similarly generated based on the set 360 of FIG. 3D. As mentioned above, each updated hopping pattern is referenced by a pattern # (n) same as a corresponding first pre-defined resource hopping pattern. For example, the pattern # (n) of the updated resource hopping pattern 500-0 is "0," which is identical to the pattern # (n) of its corresponding first pre-defined resource hopping pattern 300-0.

As described with respect to FIG. 4, the elements (filled with shade) in each resource hopping pattern correspond to assigned resource units that can be used in respective time frames. And each element in a resource hopping pattern can be referenced by a respective combination of resource unit # and time frame #. Accordingly, each element (filled with shade) of the updated resource hopping patterns (500-0 to 500-15 in FIG. 5A, and 520-0 to 520-11 in FIG. 5B) can be expressed as corresponding resource hopping tables, respectively, e.g., Table I and Table II, using respective resource unit # and time frame #. As shown in FIG. 5A, the updated resource hopping pattern 500-0 is selected as a representative example disposed on a coordinate made of such resource unit # and time frame # (similar to FIG. 4). It is noted that each of the other updated resource hopping patterns of the sets 500 and 520 is disposed on the same coordinate, which is not shown for purpose of clarity.

TABLE I

| Updated resource hopping pattern of the set 500 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
| --- | --- | --- | --- | --- | --- | --- | --- | --- |
| 500-0 | 0 | 1 | 2 | 3 | 0 | 3 | 1 | 2 |
| 500-1 | 1 | 0 | 3 | 2 | 1 | 2 | 0 | 3 |
| 500-2 | 2 | 3 | 0 | 1 | 2 | 1 | 3 | 0 |
| 500-3 | 3 | 2 | 1 | 0 | 3 | 0 | 2 | 1 |
| 500-4 | 0 | 3 | 1 | 2 | 0 | 2 | 3 | 1 |
| 500-5 | 1 | 2 | 0 | 3 | 1 | 3 | 2 | 0 |
| 500-6 | 2 | 1 | 3 | 0 | 2 | 0 | 1 | 3 |
| 500-7 | 3 | 0 | 2 | 1 | 3 | 1 | 0 | 2 |
| 500-8 | 0 | 2 | 3 | 1 | 0 | 0 | 0 | 0 |
| 500-9 | 1 | 3 | 2 | 0 | 1 | 1 | 1 | 1 |

TABLE I-continued

| Updated resource hopping pattern of the set 500 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
|---|---|---|---|---|---|---|---|---|
| 500-10 | 2 | 0 | 1 | 3 | 2 | 2 | 2 | 2 |
| 500-11 | 3 | 1 | 0 | 2 | 3 | 3 | 3 | 3 |
| 500-12 | 0 | 0 | 0 | 0 | 0 | 1 | 2 | 3 |
| 500-13 | 1 | 1 | 1 | 1 | 1 | 0 | 3 | 2 |
| 500-14 | 2 | 2 | 2 | 2 | 2 | 3 | 0 | 1 |
| 500-15 | 3 | 3 | 3 | 3 | 3 | 2 | 1 | 0 |

TABLE II

| Updated resource hopping pattern of the set 520 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
|---|---|---|---|---|---|---|---|---|
| 520-0 | 0 | 1 | 2 | 3 | 0 | 3 | 1 | 2 |
| 520-1 | 1 | 0 | 3 | 2 | 1 | 2 | 0 | 3 |
| 520-2 | 2 | 3 | 0 | 1 | 2 | 1 | 3 | 0 |
| 520-3 | 3 | 2 | 1 | 0 | 3 | 0 | 2 | 1 |
| 520-4 | 0 | 3 | 1 | 2 | 0 | 2 | 3 | 1 |
| 520-5 | 1 | 2 | 0 | 3 | 1 | 3 | 2 | 0 |
| 520-6 | 2 | 1 | 3 | 0 | 2 | 0 | 1 | 3 |
| 520-7 | 3 | 0 | 2 | 1 | 3 | 1 | 0 | 2 |
| 520-8 | 0 | 2 | 3 | 1 | 0 | 1 | 2 | 3 |
| 520-9 | 1 | 3 | 2 | 0 | 1 | 0 | 3 | 2 |
| 520-10 | 2 | 0 | 1 | 3 | 2 | 3 | 0 | 1 |
| 520-11 | 3 | 1 | 0 | 2 | 3 | 2 | 1 | 0 |

In some embodiments, such a corresponding table of a set of updated resource hopping patterns may be used to indicate which of the resource units is assigned for a UE during a particular time frame. As a representative example, when the set of updated resource hopping pattern 500 is provided, a first UE is assigned with the updated resource hopping pattern 500-1 and a second UE is assigned with the updated resource hopping pattern 500-11. As such, based on Table I, during the time frame 0, the first UE may use the resource unit 1 and the second UE may use the resource unit 3; during the time frame 1, the first UE may use the resource unit 0 and the second UE may use the resource unit 1; during the time frame 2, the first UE may use the resource unit 3 and the second UE may use the resource unit 0; and so on.

In some embodiments, a resource hopping equation, corresponding to a set of updated resource hopping patterns, may be used to indicate which of the resource units is assigned for a UE during a particular time frame. In some embodiments, when the UE uses an "n (pattern #)" updated resource hopping pattern of a set of updated resource hopping patterns that is "elongated" from a corresponding set of pre-defined resource hopping patterns, a respective resource hopping equation may be used to indicate an assigned resource unit "$b_n(t)$" at time "t."

In an example where the set of updated resource hopping pattern 500 (FIG. 5A) is provided, a respective $b_n(t)$ may be represented by the following equation.

$$b_n(t) = \begin{cases} a_n(t) & 0 \le t \le 3 \\ a_m(t-4) & 4 \le t \le 7 \end{cases}$$

wherein m=mod(n+4, 16); $a_n(t)$ represents a resource unit # assigned to the UE at time "t" when only the set of pre-defined resource hopping patterns 300 (FIG. 3A) is used.

In another example where the set of updated resource hopping pattern 520 (FIG. 5B) is provided, a respective $b_n(t)$ may be represented by the following equation.

$$b_n(t) = \begin{cases} a_n(t) & 0 \le t \le 3 \\ a_m(t-4) & 4 \le t \le 7 \end{cases}$$

wherein m=mod(n+4, 12); $a_n(t)$ represents a resource unit # assigned to the UE at time "t" when only the set of pre-defined resource hopping patterns 320 (FIG. 3B) is used.

In yet another example where the set of updated resource hopping pattern 540 (FIG. 5C) is provided, a respective $b_n(t)$ may be represented by the following equation.

$$b_n(t) = \begin{cases} a_n(t) & 0 \le t \le 4 \\ a_m(t-5) & 5 \le t \le 9 \end{cases}$$

wherein m=mod(n+5, 20); $a_n(t)$ represents a resource unit # assigned to the UE at time "t" when only the set of pre-defined resource hopping patterns 340 (FIG. 3C) is used.

In yet another example where the set of updated resource hopping pattern 560 (FIG. 5D) is provided, a respective $b_n(t)$ may be represented by the following equation.

$$b_n(t) = \begin{cases} a_n(t) & 0 \le t \le 2 \\ a_m(t-3) & 3 \le t \le 5 \end{cases}$$

wherein m=mod(n+3, 6); $a_n(t)$ represents a resource unit # assigned to the UE at time "t" when only the set of pre-defined resource hopping patterns 360 (FIG. 3D) is used.

In accordance with the embodiment where the first and second pre-defined resource hopping patterns are selected from the same pattern column of the set of pre-defined resource hopping patterns, FIGS. 6A, 6B, 6C, and 6D provide exemplary sets 600, 620, 640, and 660 of updated resource hopping patterns generated from the set 300 of FIG. 3A, set 320 of FIG. 3B, set 340 of FIG. 3C, and 360 of FIG. 3D, respectively. In some embodiments, the first pre-defined resource hopping pattern is along a first pattern row, associated with a first pattern row #, e.g., $i_1$, and the second pre-defined resource hopping pattern is along a second pattern row, associated with a second pattern row #, e.g., $i_2$. More specifically, $i_2$ is selected to be next closet to $i_1$ (e.g., $(i_2, i_1)$=(1, 0), (2, 1), (3, 2), or (0, 3)), and the second pre-defined resource hopping pattern is coupled, along the time domain, to the first pre-defined resource hopping pattern to generate the updated resource hopping pattern. As such, the updated resource hopping pattern may be located at same pattern column # (j) and row # (i) as the first pre-defined resource hopping pattern, alternatively stated, sharing a same pattern # (n).

Figure 6A:
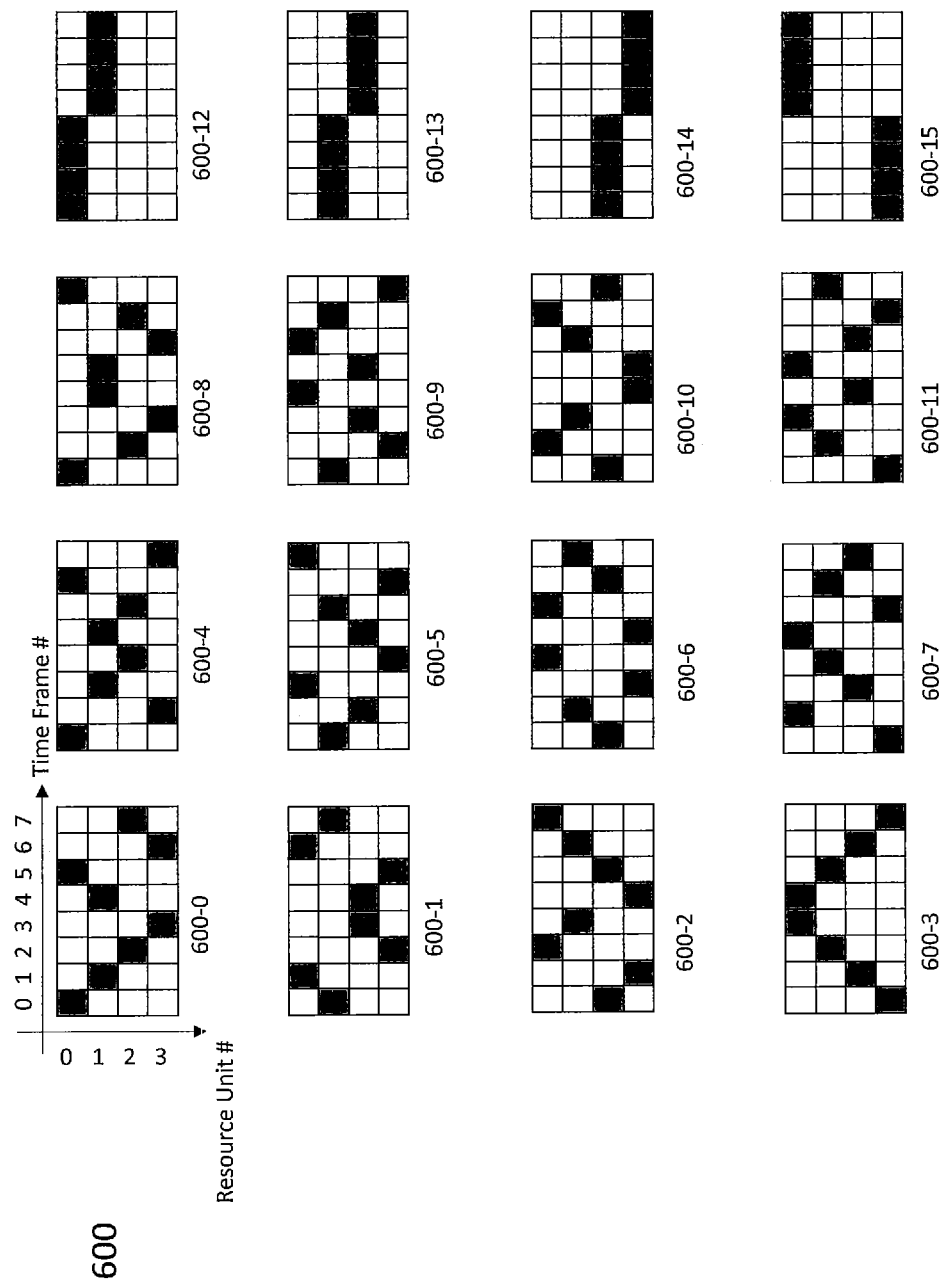
Figure 6B:
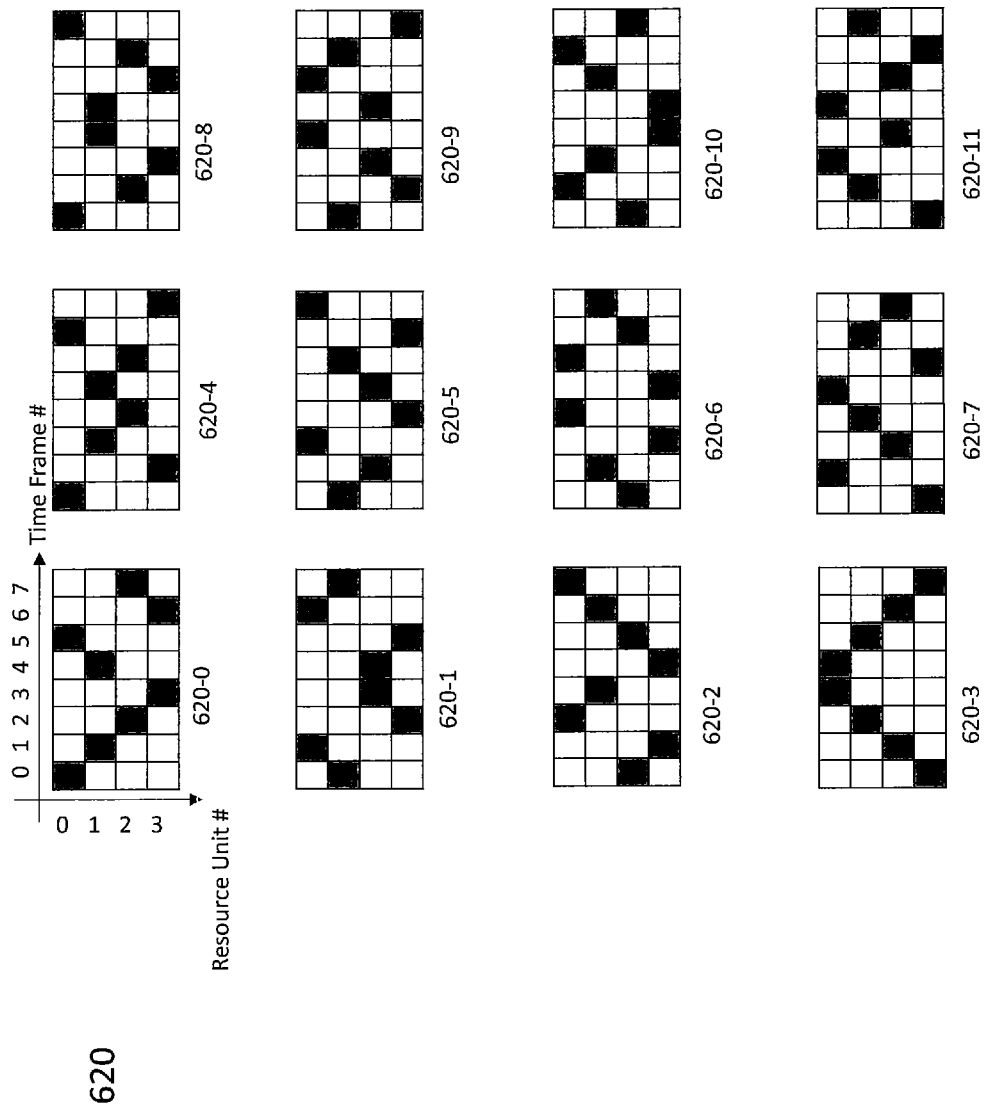
Figure 6C:
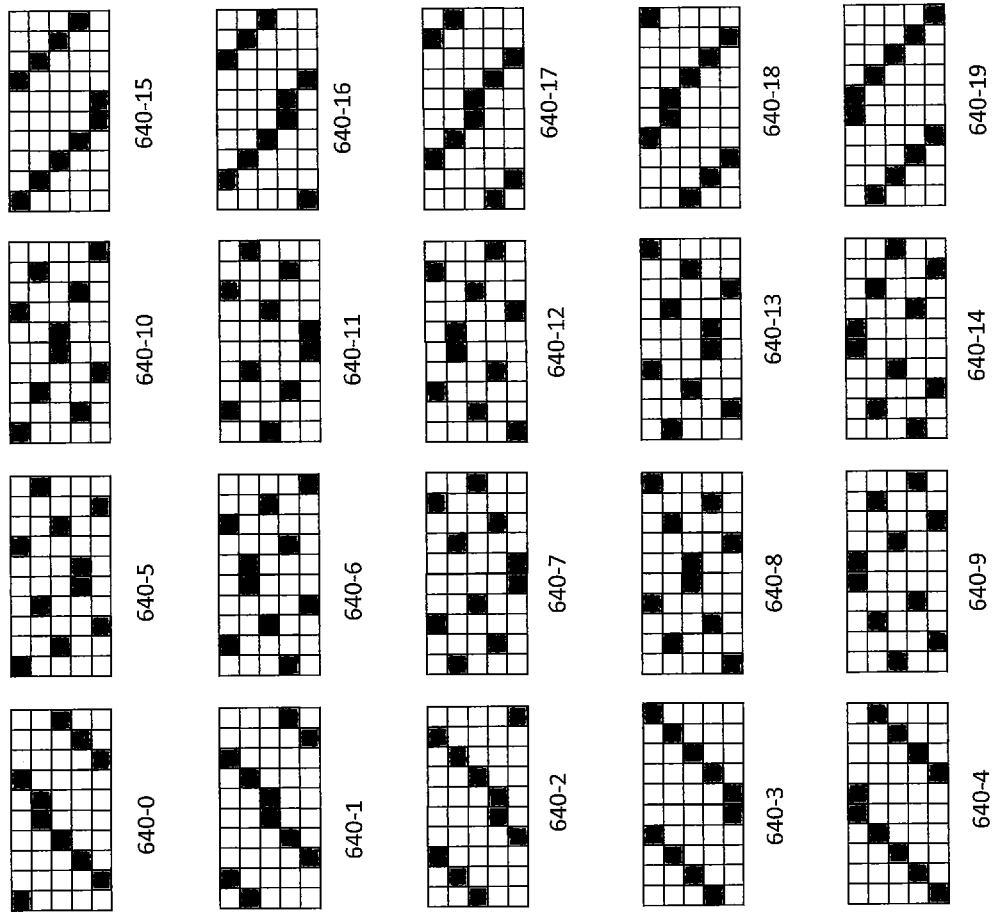

Referring first to FIG. 6A, a set 600 of updated resource hopping patterns, generated based on the set 300 of FIG. 3A, is shown. The set 600 includes updated resource hopping patterns: 600-0, 600-1, 600-2, 600-3, 600-4, 600-5, 600-6, 600-7, 600-8, 600-9, 600-10, 600-11, 600-12, 600-13, 600-14, and 600-15. According to the above-described principle, the updated resource hopping pattern 600-0 is generated by coupling the pre-defined resource hopping pattern 300-1, along the time domain, to the pre-defined resource hopping pattern 300-0; the updated resource hopping pattern 600-1 is generated by coupling the pre-defined resource hopping pattern 300-2, along the time domain, to the pre-defined resource hopping pattern 300-1; the updated resource hopping pattern 600-2 is generated by coupling the pre-defined resource hopping pattern 300-3, along the time domain, to the pre-defined resource hopping pattern 300-2; the updated resource hopping pattern 600-3 is generated by coupling the pre-defined resource hopping pattern 300-0, along the time domain, to the pre-defined resource hopping pattern 300-3; the updated resource hopping pattern 600-4 is generated by coupling the pre-defined resource hopping pattern 300-5, along the time domain, to the pre-defined resource hopping pattern 300-4; the updated resource hopping pattern 600-5 is generated by coupling the pre-defined resource hopping pattern 300-6, along the time domain, to the pre-defined resource hopping pattern 300-5; the updated resource hopping pattern 600-6 is generated by coupling the pre-defined resource hopping pattern 300-7, along the time domain, to the pre-defined resource hopping pattern 300-6; the updated resource hopping pattern 600-7 is generated by coupling the pre-defined resource hopping pattern 300-4, along the time domain, to the pre-defined resource hopping pattern 300-7; the updated resource hopping pattern 600-8 is generated by coupling the pre-defined resource hopping pattern 300-9, along the time domain, to the pre-defined resource hopping pattern 300-8; the updated resource hopping pattern 600-9 is generated by coupling the pre-defined resource hopping pattern 300-10, along the time domain, to the pre-defined resource hopping pattern 300-9; the updated resource hopping pattern 600-10 is generated by coupling the pre-defined resource hopping pattern 300-11, along the time domain, to the pre-defined resource hopping pattern 300-10; the updated resource hopping pattern 600-11 is generated by coupling the pre-defined resource hopping pattern 300-8, along the time domain, to the pre-defined resource hopping pattern 300-11; the updated resource hopping pattern 600-12 is generated by coupling the pre-defined resource hopping pattern 300-13, along the time domain, to the pre-defined resource hopping pattern 300-12; the updated resource hopping pattern 600-13 is generated by coupling the pre-defined resource hopping pattern 300-14, along the time domain, to the pre-defined resource hopping pattern 300-13; the updated resource hopping pattern 600-14 is generated by coupling the pre-defined resource hopping pattern 300-15, along the time domain, to the pre-defined resource hopping pattern 300-14; and the updated resource hopping pattern 600-15 is generated by coupling the pre-defined resource hopping pattern 300-12, along the time domain, to the pre-defined resource hopping pattern 300-15.

Following the same combination principle, the set 620 (FIG. 6B), including updated resource hopping patterns: 620-0, 620-1, 620-2, 620-3, 620-4, 620-5, 620-6, 620-7, 620-8, 620-9, 620-10, and 620-11, can be similarly generated based on the set 320 of FIG. 3B; the set 640 (FIG. 6C), including updated resource hopping patterns: 640-0, 640-1, 640-2, 640-3, 640-4, 640-5, 640-6, 640-7, 640-8, 640-9, 640-10, 640-11, 640-12, 640-13, 640-14, 640-15, 640-16, 640-17, 640-18, and 640-19, can be similarly generated based on the set 340 of FIG. 3C; and the set 660 (FIG. 6D), including updated resource hopping patterns: 660-0, 660-1, 660-2, 660-3, 660-4, and 660-5, can be similarly generated based on the set 360 of FIG. 3D. As mentioned above, each updated hopping pattern is labeled by a pattern # (n) same as a corresponding first pre-defined resource hopping pattern. For example, the pattern # (n) of the updated resource hopping pattern 600-0 is "0," which is also the pattern # (n) of its corresponding first pre-defined resource hopping pattern 300-0.

Similarly, each element (filled with shade) of the updated resource hopping patterns (600-0 to 600-15 in FIG. 6A, and 620-0 to 620-11 in FIG. 6B) can be expressed as corresponding tables, respectively, e.g., Table III and Table IV, using respective resource unit # and time frame #.

TABLE III

| Updated resource hopping pattern of the set 600 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
|---|---|---|---|---|---|---|---|---|
| 600-0 | 0 | 1 | 2 | 3 | 1 | 0 | 3 | 2 |
| 600-1 | 1 | 0 | 3 | 2 | 2 | 3 | 0 | 1 |
| 600-2 | 2 | 3 | 0 | 1 | 3 | 2 | 1 | 0 |
| 600-3 | 3 | 2 | 1 | 0 | 0 | 1 | 2 | 3 |
| 600-4 | 0 | 3 | 1 | 2 | 1 | 2 | 0 | 3 |
| 600-5 | 1 | 2 | 0 | 3 | 2 | 1 | 3 | 0 |
| 600-6 | 2 | 1 | 3 | 0 | 3 | 0 | 2 | 1 |
| 600-7 | 3 | 0 | 2 | 1 | 0 | 3 | 1 | 2 |
| 600-8 | 0 | 2 | 3 | 1 | 1 | 3 | 2 | 0 |
| 600-9 | 1 | 3 | 2 | 0 | 2 | 0 | 1 | 3 |
| 600-10 | 2 | 0 | 1 | 3 | 3 | 1 | 0 | 2 |
| 600-11 | 3 | 1 | 0 | 2 | 0 | 2 | 3 | 1 |
| 600-12 | 0 | 0 | 0 | 0 | 1 | 1 | 1 | 1 |
| 600-13 | 1 | 1 | 1 | 1 | 2 | 2 | 2 | 2 |
| 600-14 | 2 | 2 | 2 | 2 | 3 | 3 | 3 | 3 |
| 600-15 | 3 | 3 | 3 | 3 | 0 | 0 | 0 | 0 |

TABLE IV

| Updated resource hopping pattern of the set 620 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
|---|---|---|---|---|---|---|---|---|
| 620-0 | 0 | 1 | 2 | 3 | 1 | 0 | 3 | 2 |
| 620-1 | 1 | 0 | 3 | 2 | 2 | 3 | 0 | 1 |
| 620-2 | 2 | 3 | 0 | 1 | 3 | 2 | 1 | 0 |
| 620-3 | 3 | 2 | 1 | 0 | 0 | 1 | 2 | 3 |
| 620-4 | 0 | 3 | 1 | 2 | 1 | 2 | 0 | 3 |
| 620-5 | 1 | 2 | 0 | 3 | 2 | 1 | 3 | 0 |
| 620-6 | 2 | 1 | 3 | 0 | 3 | 0 | 2 | 1 |
| 620-7 | 3 | 0 | 2 | 1 | 0 | 3 | 1 | 2 |
| 620-8 | 0 | 2 | 3 | 1 | 1 | 3 | 2 | 0 |
| 620-9 | 1 | 3 | 2 | 0 | 2 | 0 | 1 | 3 |
| 620-10 | 2 | 0 | 1 | 3 | 3 | 1 | 0 | 2 |
| 620-11 | 3 | 1 | 0 | 2 | 0 | 2 | 3 | 1 |

In some embodiments, such a corresponding table of a set of updated resource hopping patterns may be used to indicate which of the resource units is assigned for a UE during a particular time frame. As a representative example, when the set of updated resource hopping pattern 600 is provided, a first UE is assigned with the updated resource hopping pattern 600-1 and a second UE is assigned with the updated resource hopping pattern 600-11. As such, based on Table IV, during the time frame 0, the first UE may use the resource unit 0 and the second UE may use the resource unit 3; during the time frame 2, the first UE may use the resource unit 2 and the second UE may use the resource unit 0; and so on.

Similarly, in some embodiments, when the UE uses an "n (pattern #)" updated resource hopping pattern of a set of updated resource hopping patterns that is "elongated" from a corresponding set of pre-defined resource hopping patterns, a respective resource hopping equation may be used to indicate an assigned resource unit "$b_n(t)$" at time "t."

In an example where the set of updated resource hopping pattern 600 (FIG. 6A) is provided, a respective $b_n(t)$ may be represented by the following equation.

$$b_n(t) = \begin{cases} a_n(t) & 0 \le t \le 3 \\ a_m(t-4) & 4 \le t \le 7 \end{cases}$$

wherein n is one of the values of 0, 1, . . . , 15; m=mod(n+1, 4)+$\lfloor n/4 \rfloor \times 4$; $a_n(t)$ represents a resource unit # assigned to the UE at time "t" when only the set of pre-defined resource hopping patterns 300 (FIG. 3A) is used.

In another example where the set of updated resource hopping pattern 620 (FIG. 6B) is provided, a respective $b_n(t)$ may be represented by the following equation.

$$b_n(t) = \begin{cases} a_n(t) & 0 \le t \le 3 \\ a_m(t-4) & 4 \le t \le 7 \end{cases}$$

wherein n is one of the values of 0, 1, . . . , 11; m=mod(n+1, 4)+$\lfloor n/4 \rfloor \times 4$; $a_n(t)$ represents a resource unit # assigned to the UE at time "t" when only the set of pre-defined resource hopping patterns 320 (FIG. 3B) is used.

In yet another example where the set of updated resource hopping pattern 640 (FIG. 6C) is provided, a respective $b_n(t)$ may be represented by the following equation.

$$b_n(t) = \begin{cases} a_n(t) & 0 \le t \le 4 \\ a_m(t-5) & 5 \le t \le 9 \end{cases}$$

wherein n is one of the values of 0, 1, . . . , 19; m=mod(n+1, 5)+⌊n/5⌋×5; $a_n(t)$ represents a resource unit # assigned to the UE at time "t" when only the set of pre-defined resource hopping patterns 340 (FIG. 3C) is used.

In yet another example where the set of updated resource hopping pattern 660 (FIG. 6D) is provided, a respective $b_n(t)$ may be represented by the following equation.

$$b_n(t) = \begin{cases} a_n(t) & 0 \le t \le 2 \\ a_m(t-3) & 3 \le t \le 5 \end{cases}$$

wherein n is one of the values of 0, 1, . . . , 5; m=mod(n+1, 3)+⌊n/3⌋×3; $a_n(t)$ represents a resource unit # assigned to the UE at time "t" when only the set of pre-defined resource hopping patterns 360 (FIG. 3D) is used.

Figure 7A:
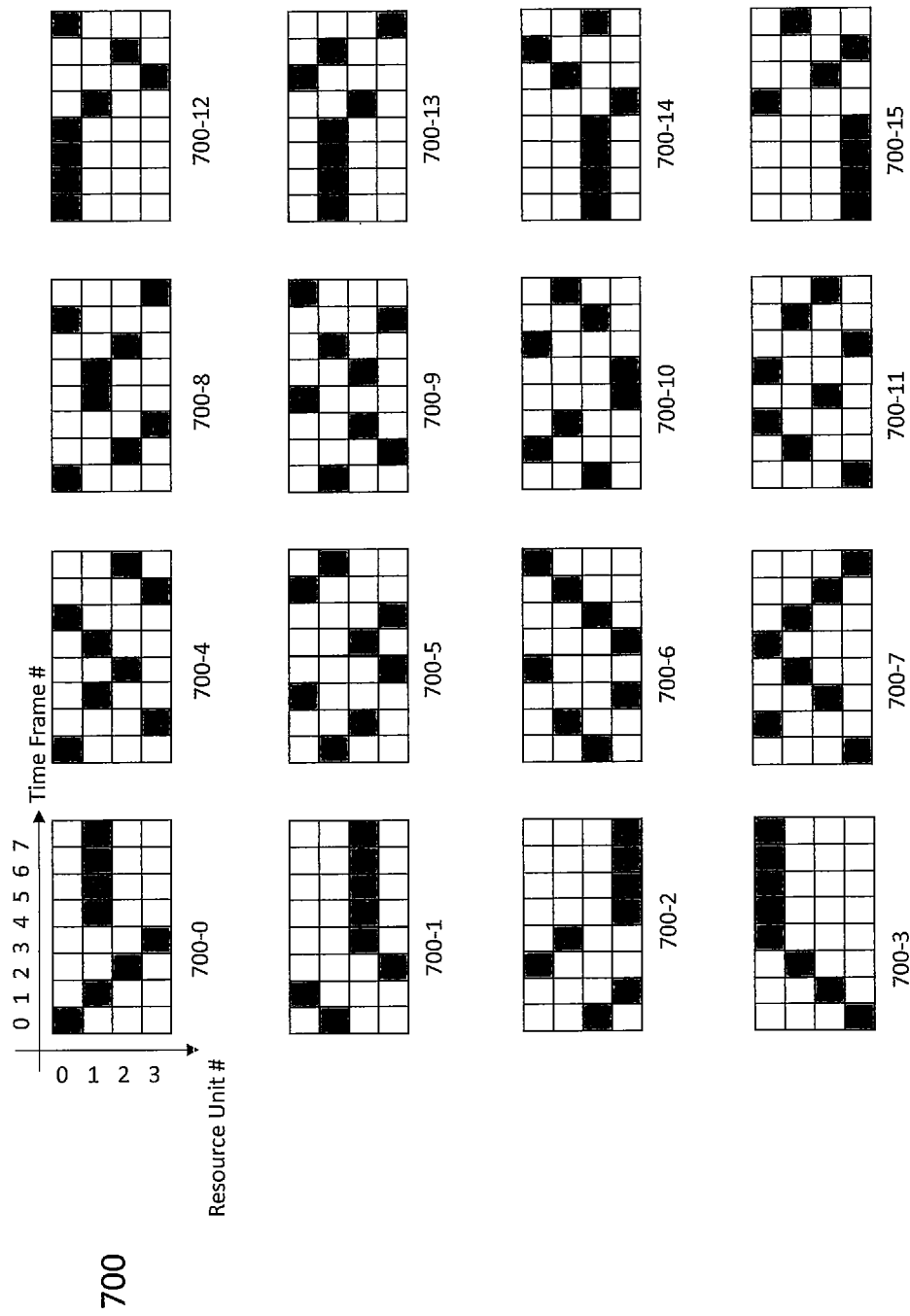
Figure 7B:
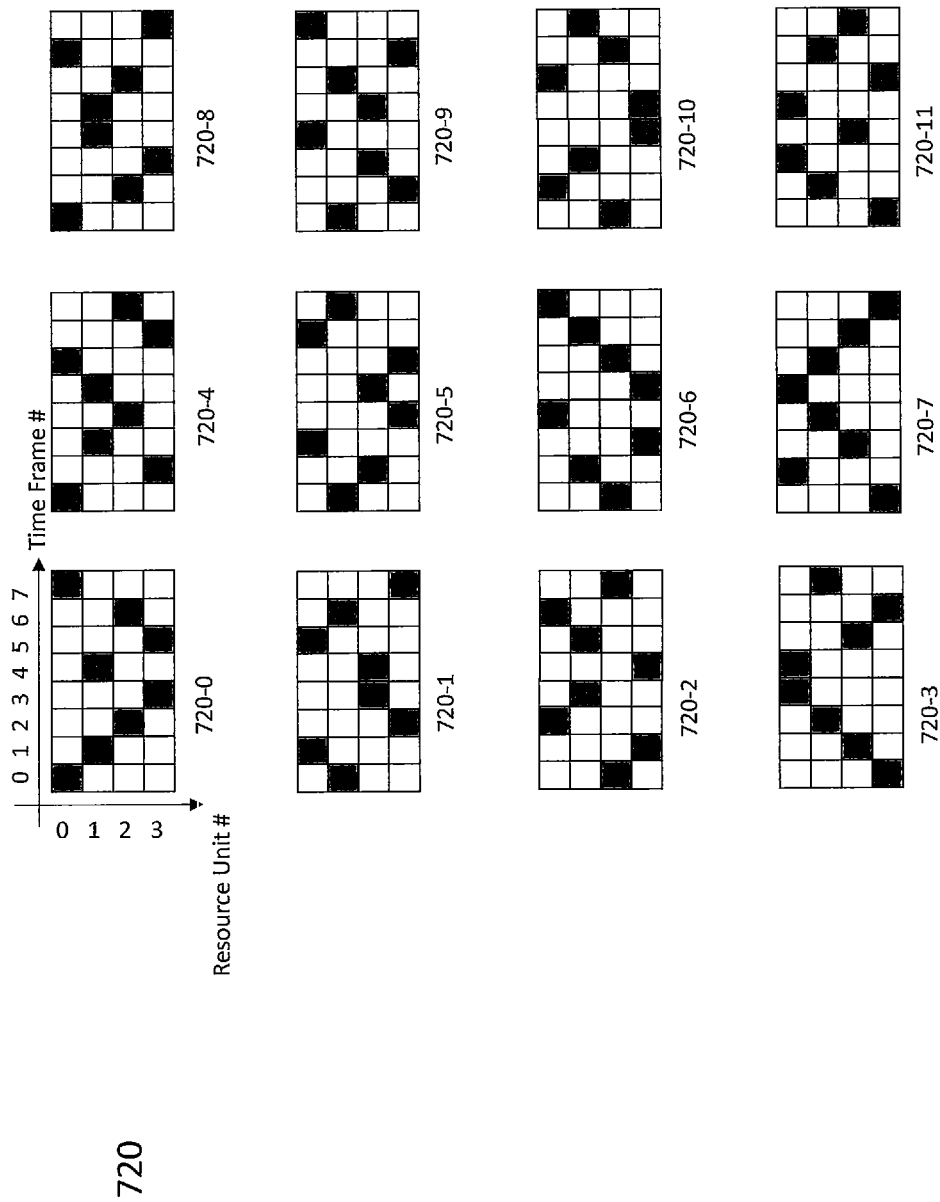

In accordance with the embodiment where the first and second pre-defined resource hopping patterns are selected from respective different pattern columns and rows of the set of pre-defined resource hopping patterns, FIGS. 7A and 7B provides exemplary sets 700 and 720 of updated resource hopping patterns generated from the set 300 of FIG. 3A and from the set 320 of FIG. 3B, respectively. In some embodiments, the first pre-defined resource hopping pattern is located at a first pattern row, associated with a first pattern row #, e.g., $i_1$, and a first pattern column, associated with a first pattern column #, e.g., $j_1$; and the second pre-defined resource hopping pattern is located at a second pattern row, associated with a second pattern row #, e.g., $i_2$, and a second pattern column, associated with a second pattern column #, e.g., $j_2$. More specifically, $i_2$ is selected to be previously closet to $i_1$ (e.g., $(i_2, i_1)$=(0, 1), (1, 2), (2, 3), or (3, 0)), and $j_2$ is selected to be previously closet to $j_1$ (e.g., $(j_2, j_1)$=(0, 1), (1, 2), (2, 3), or (3, 0)). And the second pre-defined resource hopping pattern is coupled, along the time domain, to the first pre-defined resource hopping pattern to generate the updated resource hopping pattern. As such, the updated resource hopping pattern may be located at same pattern column # (j) and row # (i) as the first pre-defined resource hopping pattern, alternatively stated, sharing a same pattern # (n).

Referring first to FIG. 7A, the set 700 of updated resource hopping patterns, generated based on the set 300 of FIG. 3A, is shown. The set 700 includes updated resource hopping patterns: 700-0, 700-1, 700-2, 700-3, 700-4, 700-5, 700-6, 700-7, 700-8, 700-9, 700-10, 700-11, 700-12, 700-13, 700-14, and 700-15. According to the above-described principle, the updated resource hopping pattern 700-0 is generated by coupling the pre-defined resource hopping pattern 300-13, along the time domain, to the pre-defined resource hopping pattern 300-0; the updated resource hopping pattern 700-1 is generated by coupling the pre-defined resource hopping pattern 300-14, along the time domain, to the pre-defined resource hopping pattern 300-1; the updated resource hopping pattern 700-2 is generated by coupling the pre-defined resource hopping pattern 300-15, along the time domain, to the pre-defined resource hopping pattern 300-2; the updated resource hopping pattern 700-3 is generated by coupling the pre-defined resource hopping pattern 300-12, along the time domain, to the pre-defined resource hopping pattern 300-3; the updated resource hopping pattern 700-4 is generated by coupling the pre-defined resource hopping pattern 300-1, along the time domain, to the pre-defined resource hopping pattern 300-4; the updated resource hopping pattern 700-5 is generated by coupling the pre-defined resource hopping pattern 300-2, along the time domain, to the pre-defined resource hopping pattern 300-5; the updated resource hopping pattern 700-6 is generated by coupling the pre-defined resource hopping pattern 300-3, along the time domain, to the pre-defined resource hopping pattern 300-6; the updated resource hopping pattern 700-7 is generated by coupling the pre-defined resource hopping pattern 300-0, along the time domain, to the pre-defined resource hopping pattern 300-7; the updated resource hopping pattern 700-8 is generated by coupling the pre-defined resource hopping pattern 300-5, along the time domain, to the pre-defined resource hopping pattern 300-8; the updated resource hopping pattern 700-9 is generated by coupling the pre-defined resource hopping pattern 300-6, along the time domain, to the pre-defined resource hopping pattern 300-9; the updated resource hopping pattern 700-10 is generated by coupling the pre-defined resource hopping pattern 300-7, along the time domain, to the pre-defined resource hopping pattern 300-10; the updated resource hopping pattern 700-11 is generated by coupling the pre-defined resource hopping pattern 300-4, along the time domain, to the pre-defined resource hopping pattern 300-11; the updated resource hopping pattern 700-12 is generated by coupling the pre-defined resource hopping pattern 300-9, along the time domain, to the pre-defined resource hopping pattern 300-12; the updated resource hopping pattern 700-13 is generated by coupling the pre-defined resource hopping pattern 300-10, along the time domain, to the pre-defined resource hopping pattern 300-13; the updated resource hopping pattern 700-14 is generated by coupling the pre-defined resource hopping pattern 300-11, along the time domain, to the pre-defined resource hopping pattern 300-14; and the updated resource hopping pattern 700-15 is generated by coupling the pre-defined resource hopping pattern 300-8, along the time domain, to the pre-defined resource hopping pattern 300-15.

Following the same combination principle, the set 720 (FIG. 7B), including updated resource hopping patterns: 720-0, 720-1, 720-2, 720-3, 720-4, 720-5, 720-6, 720-7, 720-8, 720-9, 720-10, and 720-11, can be similarly generated based on the set 320 of FIG. 3B. As mentioned above, each updated hopping pattern is labeled by a pattern # (n) same as a corresponding first pre-defined resource hopping pattern. For example, the pattern # (n) of the updated resource hopping pattern 700-0 is "0," which is also the pattern # (n) of its corresponding first pre-defined resource hopping pattern 300-0.

Similarly, each element (filled with shade) of the updated resource hopping patterns (700-0 to 700-15 in FIG. 7A, and 720-0 to 720-11 in FIG. 7B) can be expressed as corresponding tables, respectively, e.g., Table V and Table VI, using respective resource unit # and time frame #.

TABLE V

| Updated resource hopping pattern of the set 700 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit# assinged during time frame 5 | Resource unit # assinged during time frame 6 | Resource unit # assinged during time frame 7 |
|---|---|---|---|---|---|---|---|---|
| 700-0 | 0 | 1 | 2 | 3 | 1 | 1 | 1 | 1 |
| 700-1 | 1 | 0 | 3 | 2 | 2 | 2 | 2 | 2 |
| 700-2 | 2 | 3 | 0 | 1 | 3 | 3 | 3 | 3 |
| 700-3 | 3 | 2 | 1 | 0 | 0 | 0 | 0 | 0 |
| 700-4 | 0 | 3 | 1 | 2 | 1 | 0 | 3 | 2 |
| 700-5 | 1 | 2 | 0 | 3 | 2 | 3 | 0 | 1 |
| 700-6 | 2 | 1 | 3 | 0 | 3 | 2 | 1 | 0 |
| 700-7 | 3 | 0 | 2 | 1 | 0 | 1 | 2 | 3 |
| 700-8 | 0 | 2 | 3 | 1 | 1 | 2 | 0 | 3 |
| 700-9 | 1 | 3 | 2 | 0 | 2 | 1 | 3 | 0 |
| 700-10 | 2 | 0 | 1 | 3 | 3 | 0 | 2 | 1 |
| 700-11 | 3 | 1 | 0 | 2 | 0 | 3 | 1 | 2 |
| 700-12 | 0 | 0 | 0 | 0 | 1 | 3 | 2 | 0 |
| 700-13 | 1 | 1 | 1 | 1 | 2 | 0 | 1 | 3 |
| 700-14 | 2 | 2 | 2 | 2 | 3 | 1 | 0 | 2 |
| 700-15 | 3 | 3 | 3 | 3 | 0 | 2 | 3 | 1 |

TABLE VI

| Updated resource hopping pattern of the set 720 | Resource unit # assinged during time frame 0 | Resource unit # assinged during time frame 1 | Resource unit # assinged during time frame 2 | Resource unit # assinged during time frame 3 | Resource unit # assinged during time frame 4 | Resource unit # assinged during time frame 5 | Resource unit # assinged during time frame 6 | Resource unit # assinged during time frame 7 |
|---|---|---|---|---|---|---|---|---|
| 720-0 | 0 | 1 | 2 | 3 | 1 | 3 | 2 | 0 |
| 720-1 | 1 | 0 | 3 | 2 | 2 | 0 | 1 | 3 |
| 720-2 | 2 | 3 | 0 | 1 | 3 | 1 | 0 | 2 |
| 720-3 | 3 | 2 | 1 | 0 | 0 | 2 | 3 | 1 |
| 720-4 | 0 | 3 | 1 | 2 | 1 | 0 | 3 | 2 |
| 720-5 | 1 | 2 | 0 | 3 | 2 | 3 | 0 | 1 |
| 720-6 | 2 | 1 | 3 | 0 | 3 | 2 | 1 | 0 |
| 720-7 | 3 | 0 | 2 | 1 | 0 | 1 | 2 | 3 |
| 720-8 | 0 | 2 | 3 | 1 | 1 | 2 | 0 | 3 |
| 720-9 | 1 | 3 | 2 | 0 | 2 | 1 | 3 | 0 |
| 720-10 | 2 | 0 | 1 | 3 | 3 | 0 | 2 | 1 |
| 720-11 | 3 | 1 | 0 | 2 | 0 | 3 | 1 | 2 |

Still similarly, in some embodiments, when the UE uses an "n (pattern #)" updated resource hopping pattern of a set of updated resource hopping patterns that is "elongated" from a corresponding set of pre-defined resource hopping patterns, a respective resource hopping equation may be used to indicate an assigned resource unit "$b_n(t)$" at time "t."

In an example where the set of updated resource hopping pattern 700 (FIG. 7A) is provided, a respective ($b_n(t)$) may be represented by the following equation.

$$b_n(t) = \begin{cases} a_n(t) & 0 \le t \le 3 \\ a_m(t-4) & 4 \le t \le 7 \end{cases}$$

wherein $$m = j \times 4 + i;\ j = \mathrm{mod}\left(\left\lfloor \frac{n}{4} \right\rfloor - 1, 4\right);$$

i=mod(n+1, 4); $a_n(t)$ represents a resource unit # assigned to the UE at time "t" when only the set of pre-defined resource hopping patterns 300 (FIG. 3A) is used.

In another example where the set of updated resource hopping pattern 720 (FIG. 7B) is provided, a respective $b_n(t)$ may be represented by the following equation.

$$b_n(t) = \begin{cases} a_n(t) & 0 \le t \le 3 \\ a_m(t-4) & 4 \le t \le 7 \end{cases}$$

wherein $$m = j \times 4 + i;\ j = \mathrm{mod}\left(\left\lfloor \frac{n}{4} \right\rfloor - 1, 3\right);$$

i=mod(n+1, 4); $a_n(t)$ represents a resource unit # assigned to the UE at time "t" when only the set of pre-defined resource hopping patterns 320 (FIG. 3B) is used.

In some embodiments, a resource hopping equation, corresponding to a set of updated resource hopping patterns, may be used to indicate which of the resource units is assigned for a UE during a particular time frame. In some embodiments, when the UE uses an "n (pattern #)" updated resource hopping pattern of a set of updated resource hopping patterns that is "elongated" from a corresponding set of pre-defined resource hopping patterns, the following resource hopping equation may be used to indicate an assigned resource unit "$b_n(t)$" at time "t".

$$b_n(t) = \begin{cases} a_n(t) & 0 \leq t \leq T-1 \\ a_m(t-T) & T \leq t \leq 2T-1 \end{cases},$$

wherein $m = j \times N + i$; $j = \mathrm{mod}(\lfloor n/N \rfloor + k, M)$; $i = \mathrm{mod}(n + l_j, N)$; M represents a number of pattern columns of the set of updated resource hopping patterns; N represents a number of pattern rows of the set of updated resource hopping patterns; k represents an offset of pattern column(s) between the set of updated resource hopping patterns and the corresponding set of pre-defined resource hopping patterns; represents an offset of pattern row(s) within "j-th" pattern column between the set of updated resource hopping patterns and the corresponding set of pre-defined resource hopping patterns; and T represents a respective time period of the pre-defined resource hopping pattern. More particularly, $a_n(t)$ represents a resource unit # assigned to the UE at time "t" when only the set of pre-defined resource hopping patterns is used. k can be one of $\{0, 1, \ldots, M-1\}$, and $l_0, l_1, \ldots l_{M-1}$ can each be one of $\{0, 1, \ldots, N-1\}$.

For example, when M=4, N=4, T=4, k=3, $l_0=l_1=l_2=l_3=1$, the above resource hopping equation can be used to indicate which of the resource units is assigned for a UE during a particular time frame as the UE uses the set 500 of FIG. 5A. When M=3, N=4, T=4, k=3, $l_0=l_1=l_2=l_3=0$, the above resource hopping equation can be used to indicate which of the resource units is assigned for a UE during a particular time frame as the UE uses the set 520 of FIG. 5B. When M=4, N=4, T=4, k=0, $l_0=l_1=l_2=l_3=1$, the above resource hopping equation can be used to indicate which of the resource units is assigned for a UE during a particular time frame as the UE uses the set 600 of FIG. 6A. When M=4, N=4, T=4, k=1, $l_0=l_1=l_2=l_3=1$, the above resource hopping equation can be used to indicate which of the resource units is assigned for a UE during a particular time frame as the UE uses the set 700 of FIG. 7A.

In some other embodiments, the value of "m" in the above-mentioned resource hopping equation to generate a set of updated resource hopping patterns can be determined by any of a variety of a permutation of a respective value of "n." Taking a set of pre-defined resource hopping patterns with "N" pre-defined resource hopping patterns for example, the permutation may be: mod (n+d, N); mod (n×w+g(n), N), wherein d can be any integer number and, in some embodiments, can be any integer number from 0 to N−1, w can be any integer number, and g(n) is a function of n. More specifically, when w and N are coprime, g(n) may be a constant value (i.e., not a function of n); and when w and N are not coprime, g(n) may be determined by:

$$g(n) = \mathrm{mod}\left(\left\lfloor \frac{n}{N/w} \right\rfloor + 1, w\right).$$

In some alternative embodiments, when N is a power of 2 ($N = 2^x$), the permutation may include a Bit Reverse Ordering (BRO) function to determine the value of m based on the value of n. More specifically, the value of n, in decimal, may be first converted into x binary bits, such binary bits are reversed in order by using the BRO function to generate respective x reversed binary bits, and then the reversed binary bits are converted back to a decimal value, which may be used as the value of m. As such, m may be determined by the following equation: m=mod (BRO(n)+d, N), wherein d can be any integer number, and, in some embodiments, can be any integer number from 0 to N−1. Each of the aforementioned permutation methods may be better appreciated through symbolic diagrams, which will be discussed in further detail with respect to FIGS. 19A, 19B, 19C, and 19D, respectively.

Although the above discussions of the elongating method are directed to combining two pre-defined resource hopping patterns along the time domain to generate an updated resource hopping pattern, it is understood by persons of ordinary skill in the art that the disclosed elongating method can be used to combine more than two pre-defined resource hopping patterns along the time domain to generate an updated resource hopping pattern while remaining within the scope of the present disclosure. For example, when a set of 12 pre-defined resource hopping patterns, each of which has a time period of 4, is provided, any three of such 12 pre-defined resource hopping patterns can be combined, using the disclosed elongating method, as a respective updated resource hopping pattern that has a period of 12 (3×4).

Embodiments of the Rearranging Method

Some embodiments of the rearranging method include shuffling at least two "resource columns" within each pre-defined resource hopping pattern of a respective set of pre-defined resource hopping patterns. The term "resource column," as used herein, is referred to one of a plurality of columns that constitute a pre-defined resource hopping pattern. Taking the pre-defined resource hopping pattern 300-0 of FIG. 3A as an example, four columns constitute the pre-defined resource hopping pattern 300-0, wherein such four columns are referred to as respective "resource columns" of the pre-defined resource hopping pattern 300-0. It is noted that, in some embodiments, each resource column, within a pre-defined resource hopping pattern, is associated with a respective sequence #. Continuing with the use of the pre-defined resource hopping pattern 300-0 of FIG. 3A as the example, the leftmost resource column of 300-0 is associated with sequence 0; the second leftmost resource column of 300-0 is associated with sequence 1; the second rightmost resource column of 300-0 is associated with sequence 2; and the rightmost resource column of 300-0 is associated with sequence 3. Taking the pre-defined resource hopping pattern 340-0 of FIG. 3C as another example, the leftmost resource column of 340-0 is associated with sequence 0; the second leftmost resource column of 340-0 is associated with sequence 1; the middle resource column of 340-0 is associated with sequence 2; the second rightmost resource column of 340-0 is associated with sequence 3; and the rightmost resource column of 340-0 is associated with sequence 4.

Figure 8A:
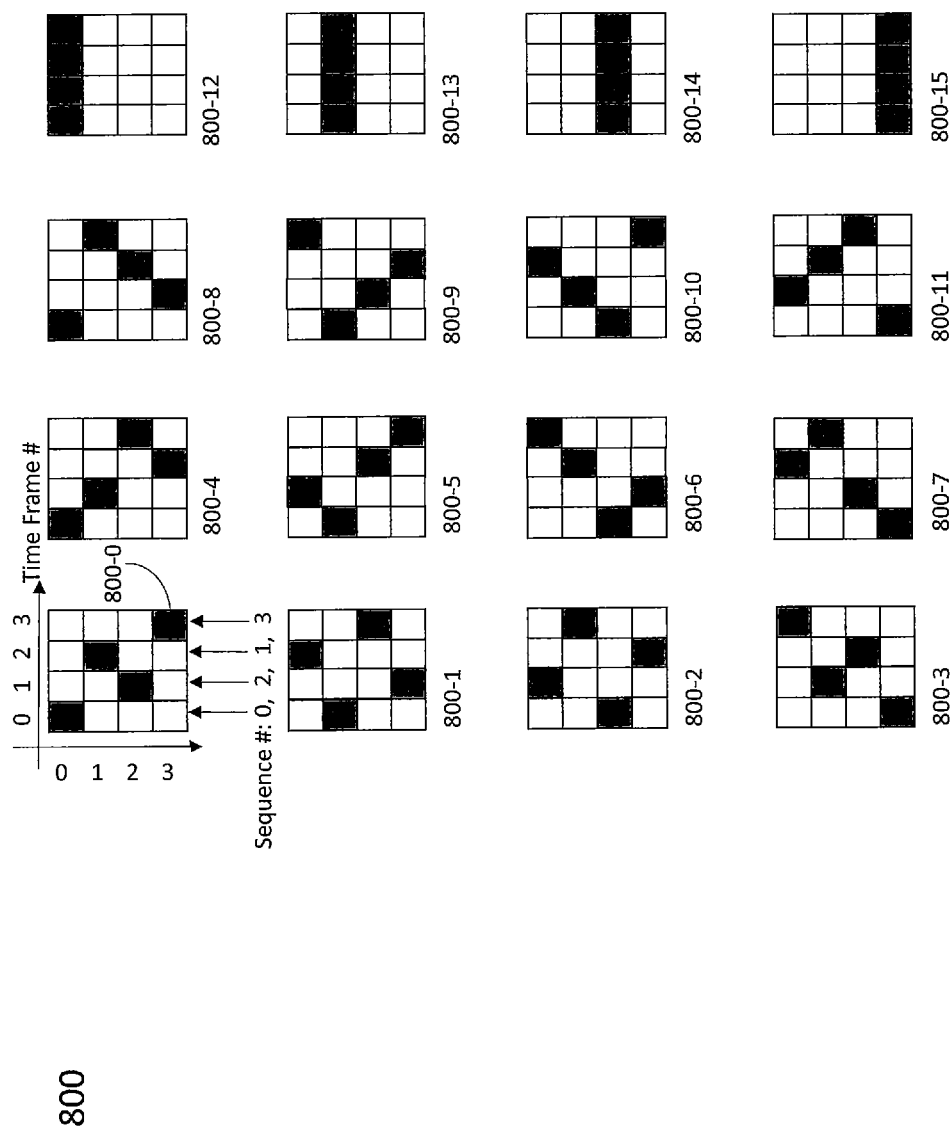
FIGS. 8A, 8B, 9A, 9B, 10A, 10B, 11, and 12 illustrate various exemplary sets of updated resource hopping patterns generated based on an rearranging method, in accordance with some embodiments of the present disclosure.
Figure 8B:
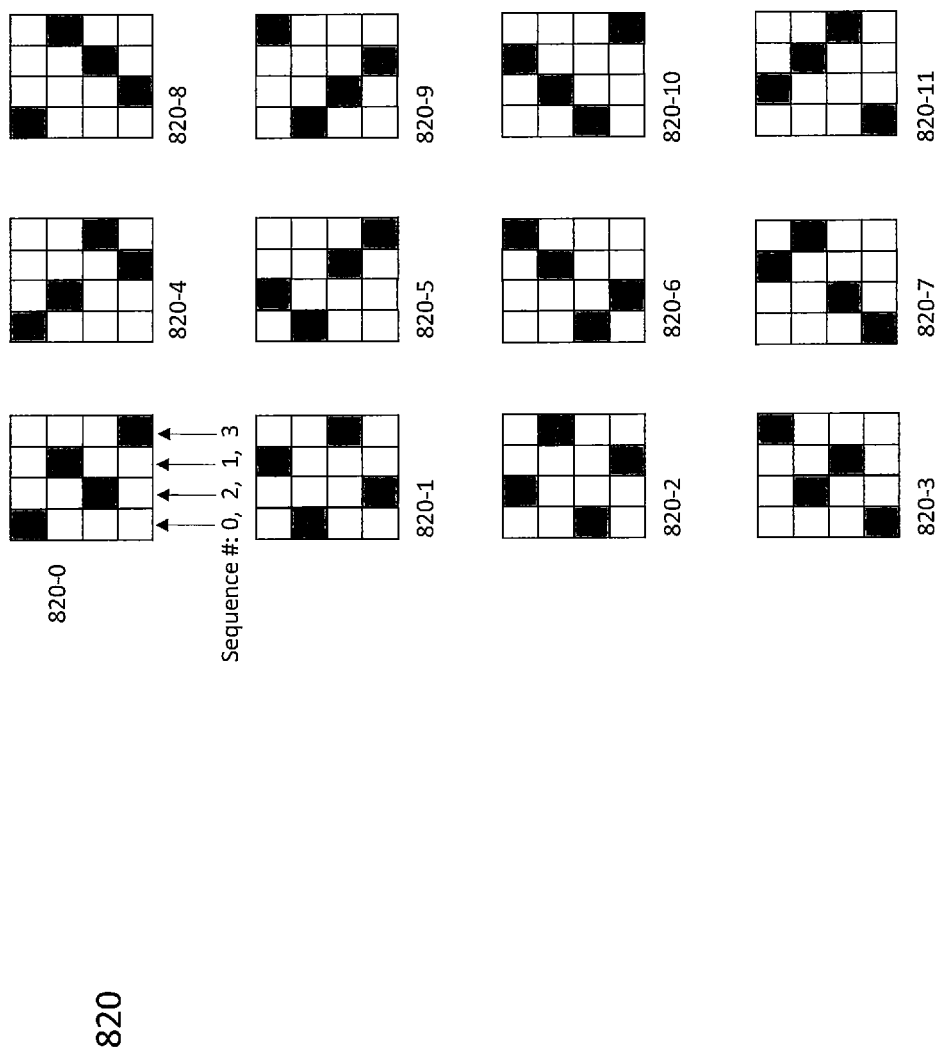
Figure 9A:
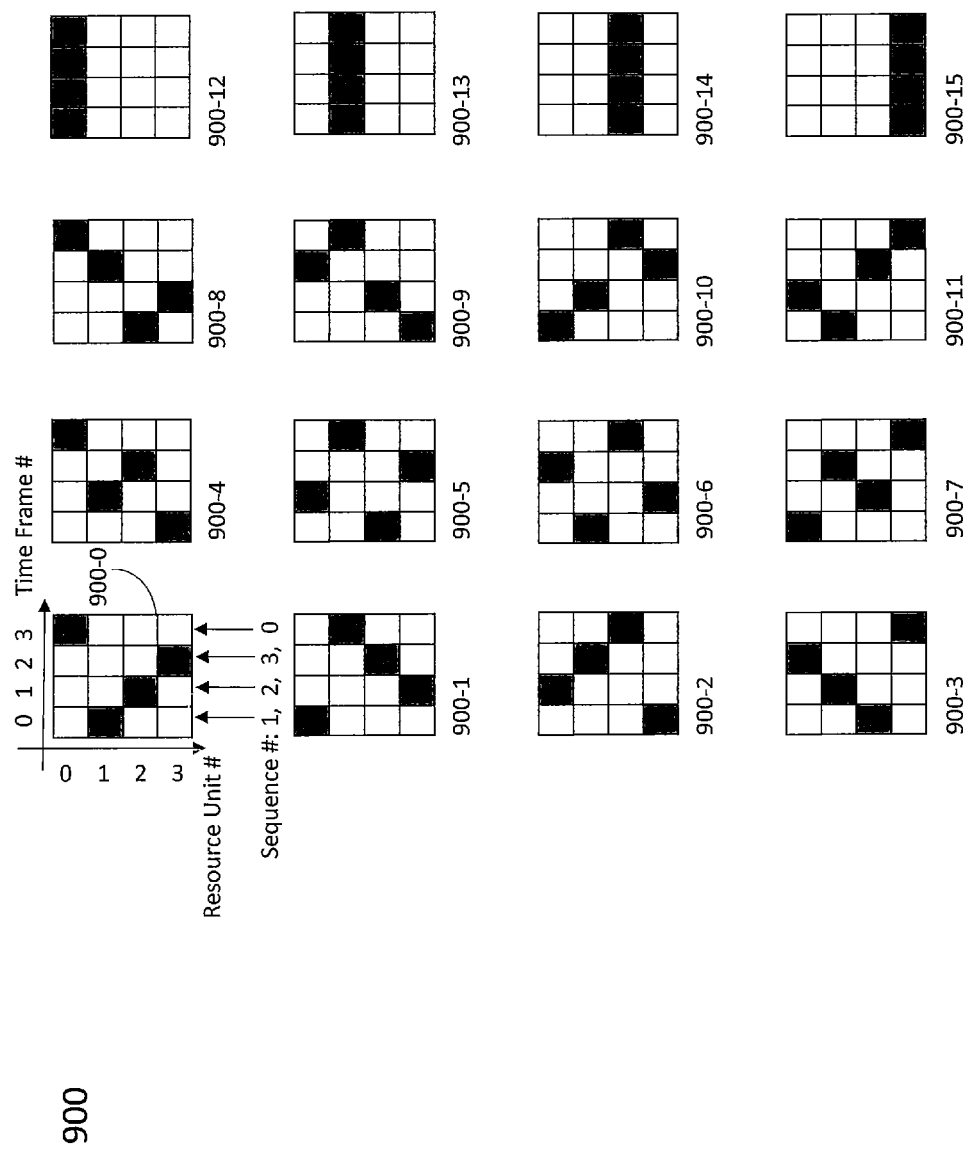
Figure 9B:
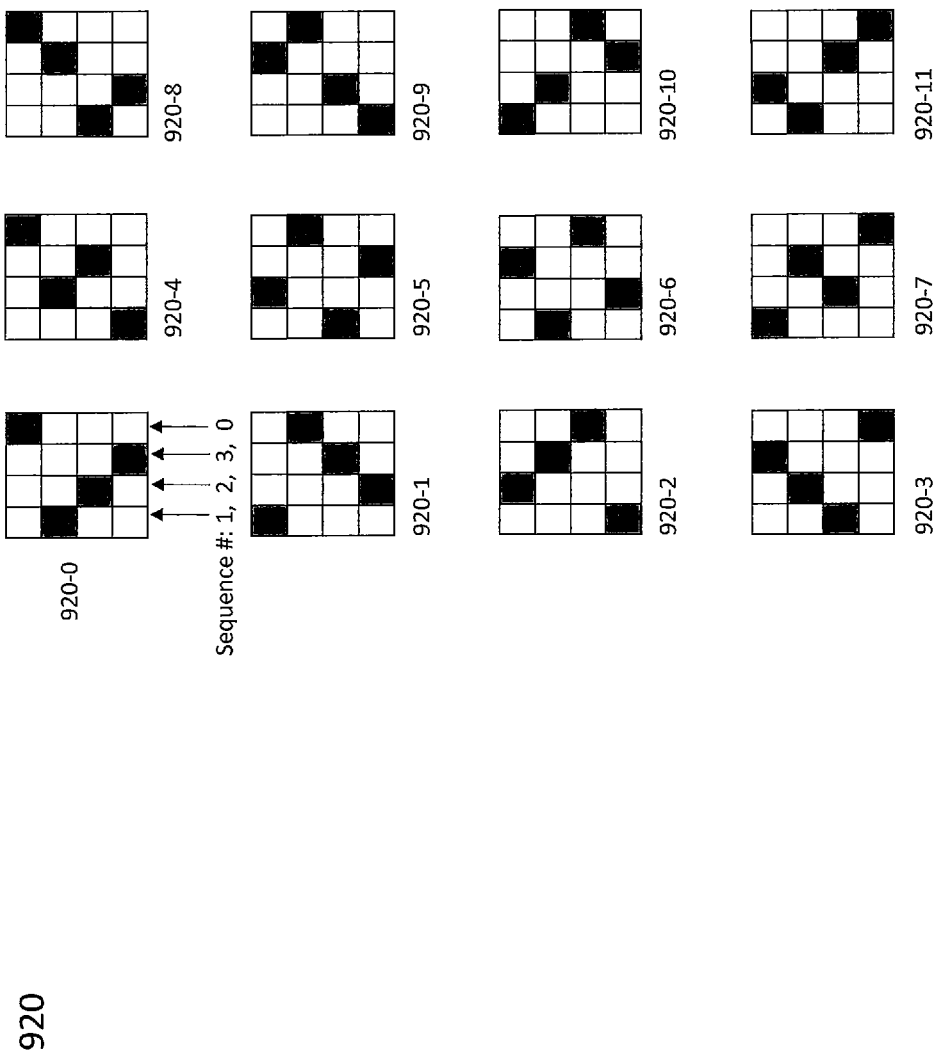
Figure 10A:
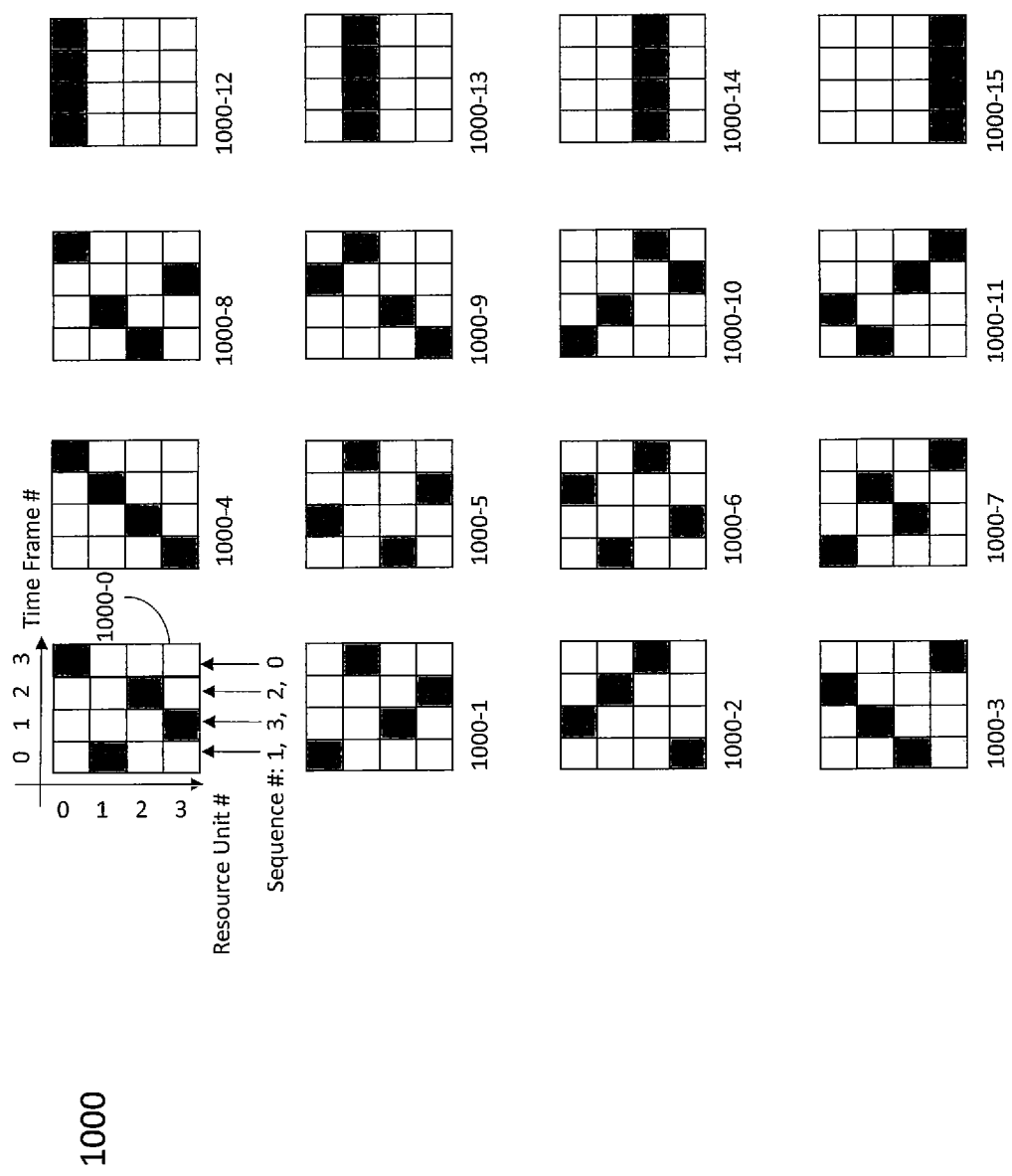
Figure 10B:
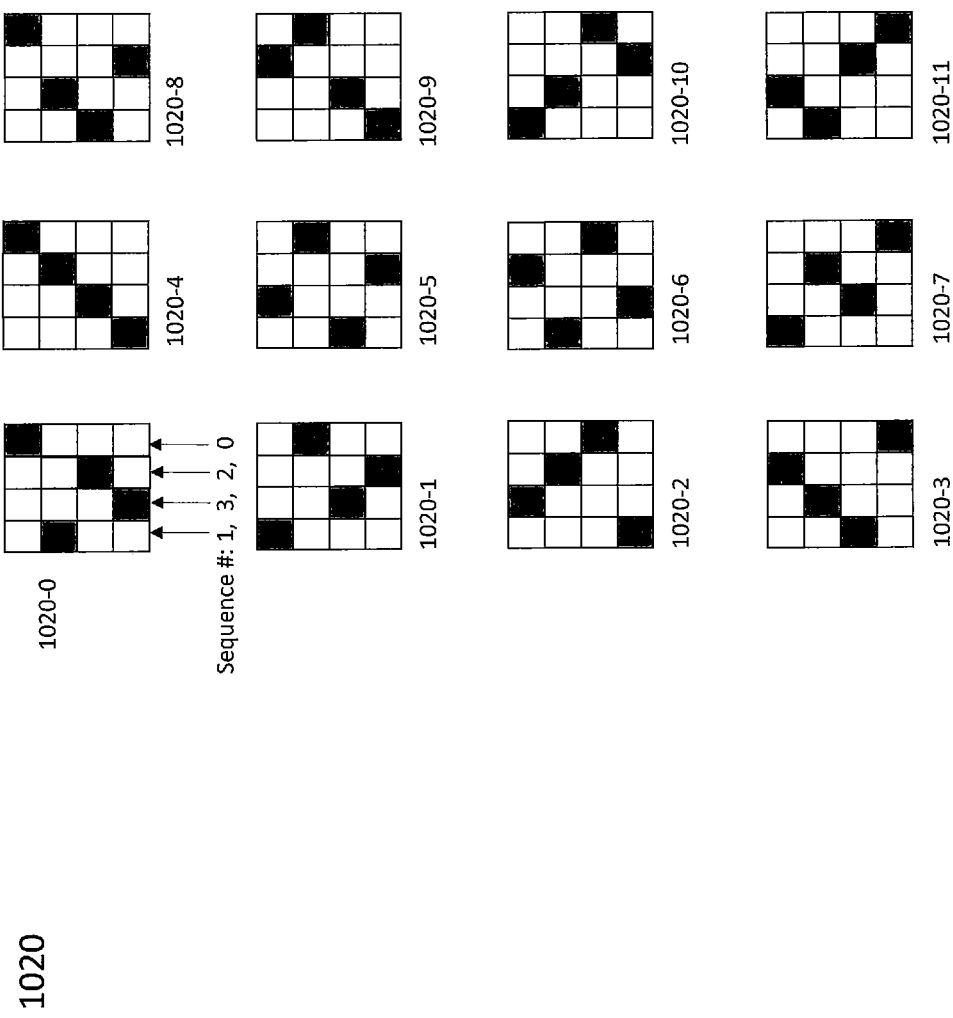
Figure 11:
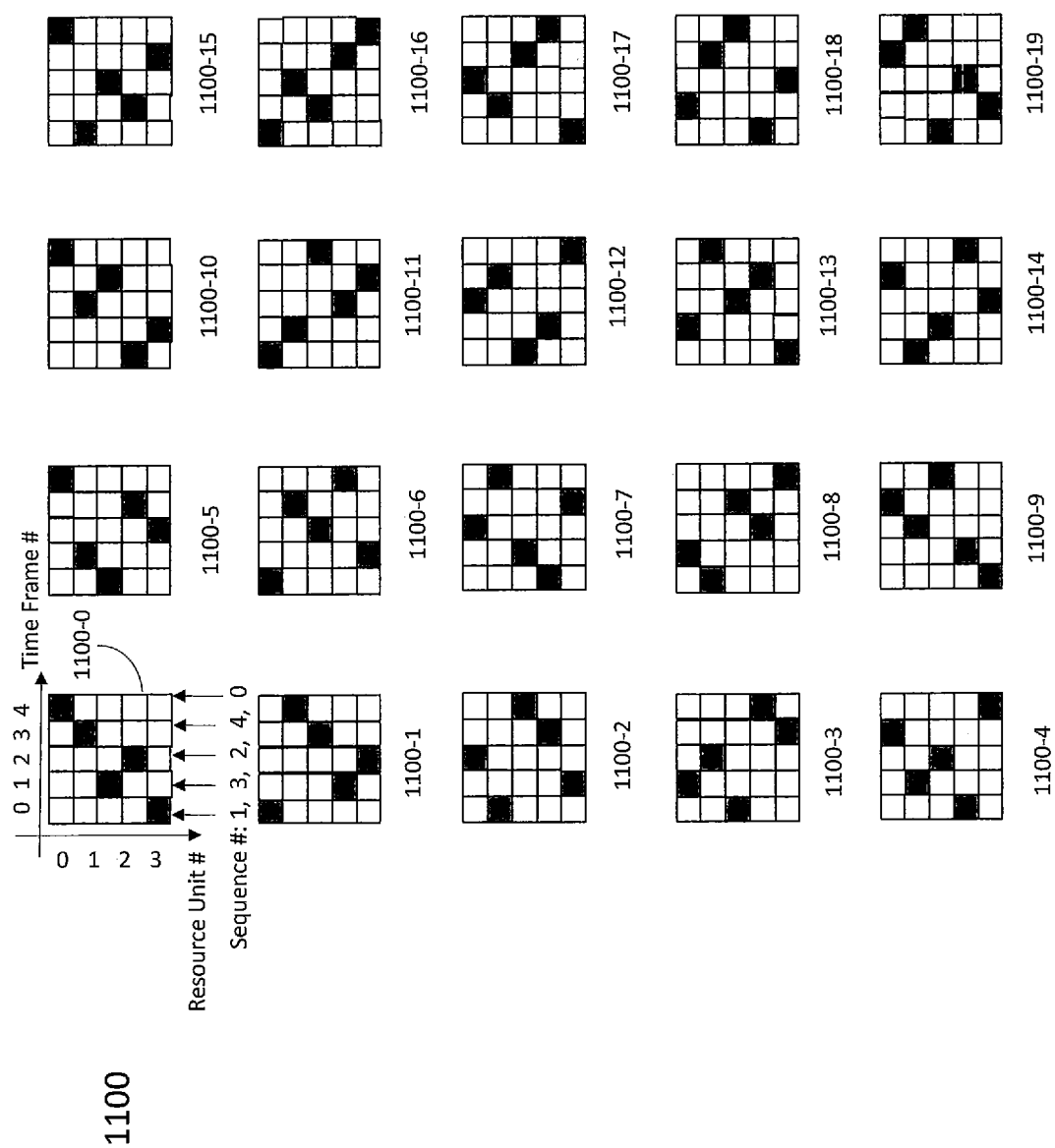
Figure 12:
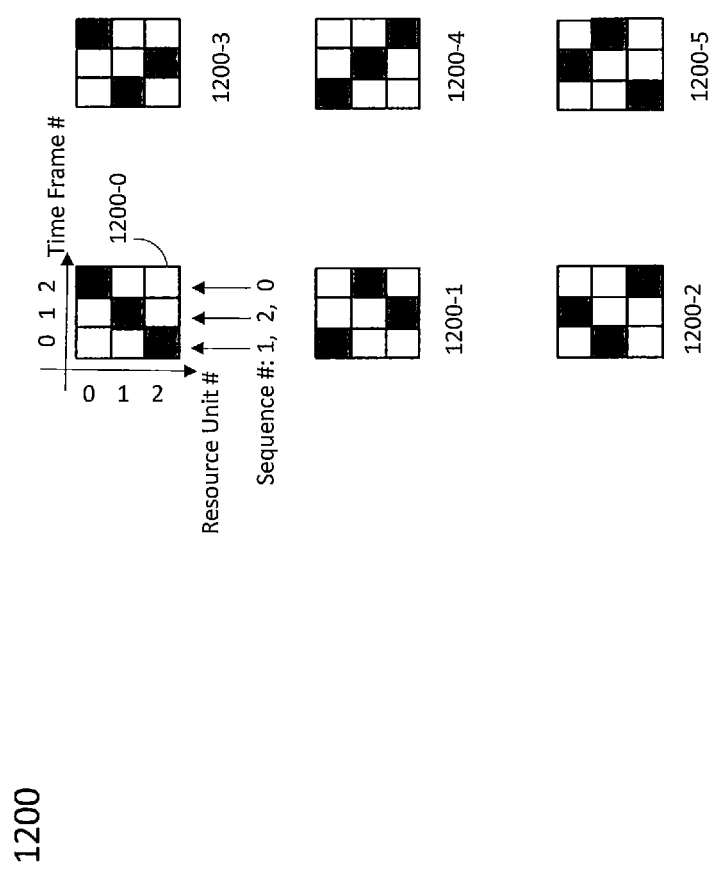

Based on the above discussion that each resource column is associated with a sequence #, FIG. 8A provides an exemplary set 800 of updated resource hopping patterns that is generated by shuffling respective two resource columns of each pre-defined resource hopping pattern in the set 300 of FIG. 3A (e.g., from sequence (0, 1, 2, 3) in FIG. 3A to sequence (0, 2, 1, 3) in FIG. 8A); FIG. 8B provides an exemplary set 820 of updated resource hopping patterns that is generated by shuffling respective two resource columns of each pre-defined resource hopping pattern in the set 320 of FIG. 3B (e.g., from sequence (0, 1, 2, 3) in FIG. 3B to sequence (0, 2, 1, 3) in FIG. 8B); FIG. 9A provides an exemplary set 900 of updated resource hopping patterns that is generated by shuffling respective four resource columns of each pre-defined resource hopping pattern in the set 300 of FIG. 3A (i.e., from sequence (0, 1, 2, 3) in FIG. 3A to sequence (1, 2, 3, 0) in FIG. 9A); FIG. 9B provides an exemplary set 920 of updated resource hopping patterns that is generated by shuffling respective four resource columns of each pre-defined resource hopping pattern in the set 320 of FIG. 3B (i.e., from sequence (0, 1, 2, 3) in FIG. 3A to sequence (1, 2, 3, 0) in FIG. 9B); FIG. 10A provides an exemplary set 1000 of updated resource hopping patterns that is generated by shuffling respective three resource columns of each pre-defined resource hopping pattern in the set 300 of FIG. 3A (i.e., from sequence (0, 1, 2, 3) in FIG. 3A to sequence (1, 3, 2, 0) in FIG. 10A); FIG. 10B provides an exemplary set 1020 of updated resource hopping patterns that is generated by shuffling respective three resource columns of each pre-defined resource hopping pattern in the set 320 of FIG. 3B (i.e., from sequence (0, 1, 2, 3) in FIG. 3A to sequence (1, 3, 2, 0) in FIG. 10B); FIG. 11 provides an exemplary set 1100 of updated resource hopping patterns that is generated by shuffling respective four resource columns of each pre-defined resource hopping pattern in the set 340 of FIG. 3C (i.e., from sequence (0, 1, 2, 3, 4) in FIG. 3C to sequence (1, 3, 2, 4, 0) in FIG. 11); FIG. 12 provides an exemplary set 1200 of updated resource hopping patterns that is generated by shuffling respective three resource columns of each pre-defined resource hopping pattern in the set 360 of FIG. 3D (i.e., from sequence (0, 1, 2) in FIG. 3D to sequence (1, 2, 0) in FIG. 12).

Referring first to FIG. 8A, the set 800 includes updated resource hopping patterns: 800-0, 800-1, 800-2, 800-3, 800-4, 800-5, 800-6, 800-7, 800-8, 800-9, 800-10, 800-11, 800-12, 800-13, 800-14, and 800-15. According to the above-described principle (from sequence (0, 1, 2, 3) in FIG. 3A to sequence (0, 2, 1, 3) in FIG. 8A), the updated resource hopping pattern 900-0 is generated by exchanging the resource columns with the sequences 1 and 2, respectively. As such, the updated resource hopping pattern 800-0 now has its respective elements (i.e., assigned resource units) at resource unit 2 and resource unit 1 during time frame 1 and time frame 2, respectively, that were originally at resource unit 1 and resource unit 2 in the pre-defined resource hopping pattern 300-0 of FIG. 3A. Similarly, in some embodiments, each of the updated resource hopping patterns 800-1 to 800-15 of the set 800 may follow the same principle to have part of respective elements located at "updated" resource unit #. Each of updated resource hopping patterns: 820-0, 820-1, 820-2, 820-3, 820-4, 820-5, 820-6, 820-7, 820-8, 820-9, 820-10, and 820-11 in the set 820 of FIG. 8B follow the same principle to have part of respective elements located at updated resource unit # with respect to the set 320 of FIG. 3B. Thus, corresponding discussions are not repeated here.

Referring then to FIG. 9A, the set 900 includes updated resource hopping patterns: 900-0, 900-1, 900-2, 900-3, 900-4, 900-5, 900-6, 900-7, 900-8, 900-9, 900-10, 900-11, 900-12, 900-13, 900-14, and 900-15. According to the above-described principle (from sequence (0, 1, 2, 3) in FIG. 3A to sequence (1, 2, 3, 0) in FIG. 9A), the updated resource hopping pattern 900-0 is generated by shuffling the resource columns with the sequences 0, 1, 2, and 3, respectively, in the pre-defined resource hopping pattern 300-0 of FIG. 3A, and more specifically, circular shifting the sequences 0, 1, 2, and 3 to the left by one sequence #. As such, the updated resource hopping pattern 900-0 now has its respective elements (i.e., assigned resource units) at resource unit 1, resource unit 2, resource unit 3, and resource unit 0 during time frame 0, time frame 1, time frame 2, and time frame 3, respectively, that were originally at resource unit 0, resource unit 1, resource unit 2, and resource unit 3 in the pre-defined resource hopping pattern 300-0 of FIG. 3A. Similarly, in some embodiments, each of the updated resource hopping patterns 900-1 to 900-15 of the set 900 may follow the same principle to have respective elements located at "updated" resource unit #. Each of updated resource hopping patterns: 920-0, 920-1, 920-2, 920-3, 920-4, 920-5, 920-6, 920-7, 920-8, 920-9, 920-10, and 920-11 in the set 920 of FIG. 9B follow the same principle to have respective elements located at updated resource unit # with respect to the set 320 of FIG. 3B. Thus, corresponding discussions are not repeated here.

Referring then to FIG. 10A, the set 1000 includes updated resource hopping patterns: 1000-0, 1000-1, 1000-2, 1000-3, 1000-4, 1000-5, 1000-6, 1000-7, 1000-8, 1000-9, 1000-10, 1000-11, 1000-12, 1000-13, 1000-14, and 1000-15. According to the above-described principle (from sequence (0, 1, 2, 3) in FIG. 3A to sequence (1, 3, 2, 0) in FIG. 10A), the updated resource hopping pattern 1000-0 is generated by shuffling the resource columns with the sequences 0, 1, and 3, respectively, in the pre-defined resource hopping pattern 300-0 of FIG. 3A. As such, the updated resource hopping pattern 1000-0 now has its respective elements (i.e., assigned resource units) at resource unit 1, resource unit 3, resource unit 2, and resource unit 0 during time frame 0, time frame 1, time frame 2, and time frame 3, respectively, that were originally at resource unit 0, resource unit 1, resource unit 2, and resource unit 3 in the pre-defined resource hopping pattern 300-0 of FIG. 3A. Similarly, in some embodiments, each of the updated resource hopping patterns 1000-1 to 1000-15 of the set 1000 may follow the same principle to have respective elements located at "updated" resource unit #. Each of updated resource hopping patterns: 1020-0, 1020-1, 1020-2, 1020-3, 1020-4, 1020-5, 1020-6, 1020-7, 1020-8, 1020-9, 1020-10, and 1020-11 in the set 1020 of FIG. 10B follow the same principle to have respective elements located at updated resource unit # with respect to the set 320 of FIG. 3B. Thus, corresponding discussions are not repeated here.

Referring then to FIG. 11, the set 1100 includes updated resource hopping patterns: 1100-0, 1100-1, 1100-2, 1100-3, 1100-4, 1100-5, 1100-6, 1100-7, 1100-8, 1100-9, 1100-10, 1100-11, 1100-12, 1100-13, 1100-14, 1100-15, 1100-16, 1100-17, 1100-18, and 1100-19. According to the above-described principle (from sequence (0, 1, 2, 3, 4) in FIG. 3C to sequence (1, 3, 2, 4, 0) in FIG. 11), the updated resource hopping pattern 1100-0 is generated by shuffling the resource columns with the sequences 0, 1, 3, and 4, respectively, in the pre-defined resource hopping pattern 340-0 of FIG. 3C. As such, the updated resource hopping pattern 1100-0 now has its respective elements (i.e., assigned resource units) at resource unit 4, resource unit 2, resource unit 3, resource unit 1, and resource unit 0 during time frame 0, time frame 1, time frame 2, time frame 3, and time frame 4, respectively, that were originally at resource unit 0, resource unit 4, resource unit 3, resource unit 2, and resource unit 1 in the pre-defined resource hopping pattern 340-0 of FIG. 3C. Similarly, in some embodiments, each of the updated resource hopping patterns 1100-1 to 1100-19 of the set 1100 may follow the same principle to have respective elements located at "updated" resource unit #.

Referring then to FIG. 12, the set 1200 includes updated resource hopping patterns: 1200-0, 1200-1, 1200-2, 1200-3, 1200-4, and 1200-5. According to the above-described principle (from sequence (0, 1, 2) in FIG. 3D to sequence (1, 2, 0) in FIG. 11), the updated resource hopping pattern 1200-0 is generated by shuffling the resource columns with the sequences 0, 1, and 2, respectively, in the pre-defined resource hopping pattern 360-0 of FIG. 3D, and more specifically, circular shifting the sequences 0, 1, and 2 to the left by one sequence #. As such, the updated resource hopping pattern 1200-0 now has its respective elements (i.e., assigned resource units) at resource unit 2, resource unit 1, and resource unit 0 during time frame 0, time frame 1, and time frame 2, respectively, that were originally at resource unit 0, resource unit 2, and resource unit 1 in the pre-defined resource hopping pattern 360-0 of FIG. 3D. Similarly, in some embodiments, each of the updated resource hopping patterns 1200-1 to 1200-5 of the set 1200 may follow the same principle to have respective elements located at "updated" resource unit #.

Embodiments of the Shortening Method

Some embodiments of the shortening method include selecting at least two "resource columns" within each pre-defined resource hopping pattern of a respective set of pre-defined resource hopping patterns, and using the at least two selected resource columns as respective updated resource columns of an updated resource hopping pattern. As such, the updated resource hopping pattern may have a "shortened" time period, e.g., a half of a time period of the pre-defined resource hopping pattern when two out of four resource columns are selected from the pre-defined resource hopping pattern. In some other embodiments, after the selection of the at least two resource columns from the respective pre-defined resource hopping pattern, the shortening method may further includes shuffling the at least two resource columns to constitute the respective updated resource columns of the updated resource hopping pattern.

Figure 13A:
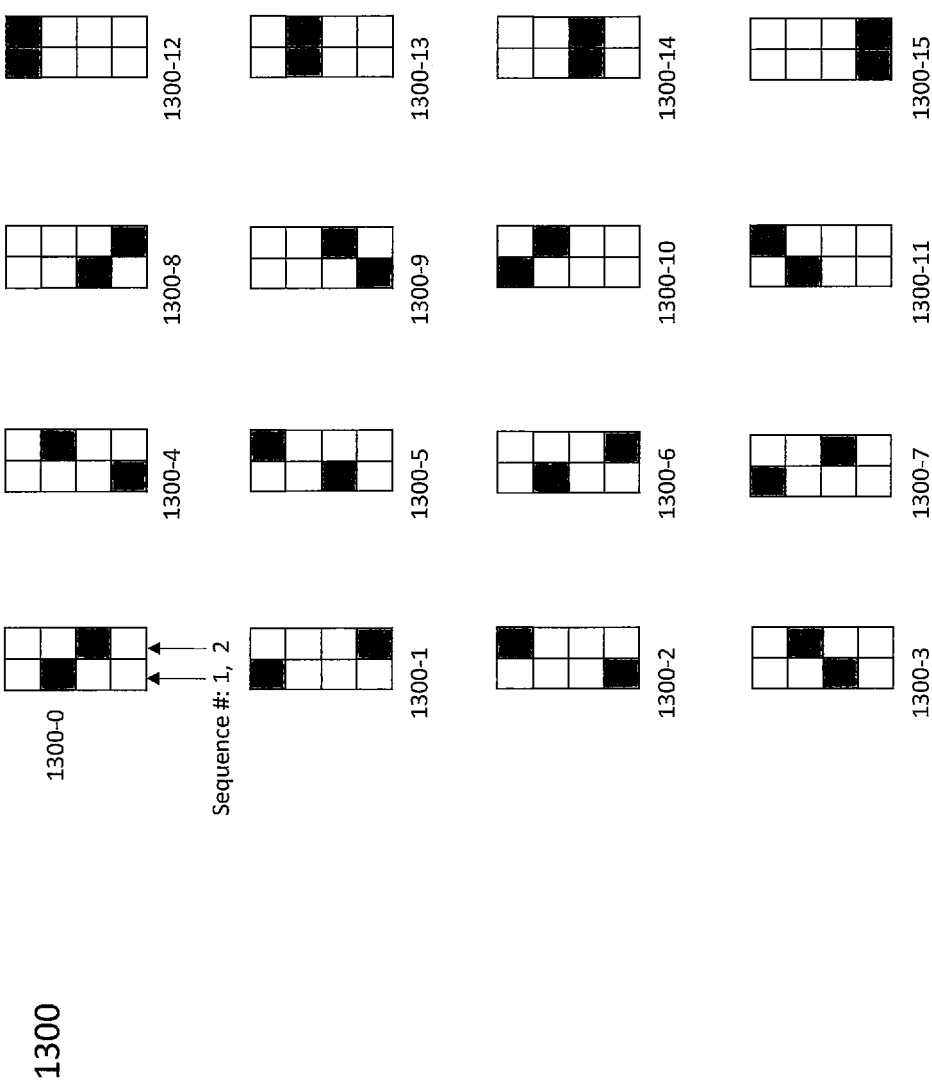
Figure 13B:
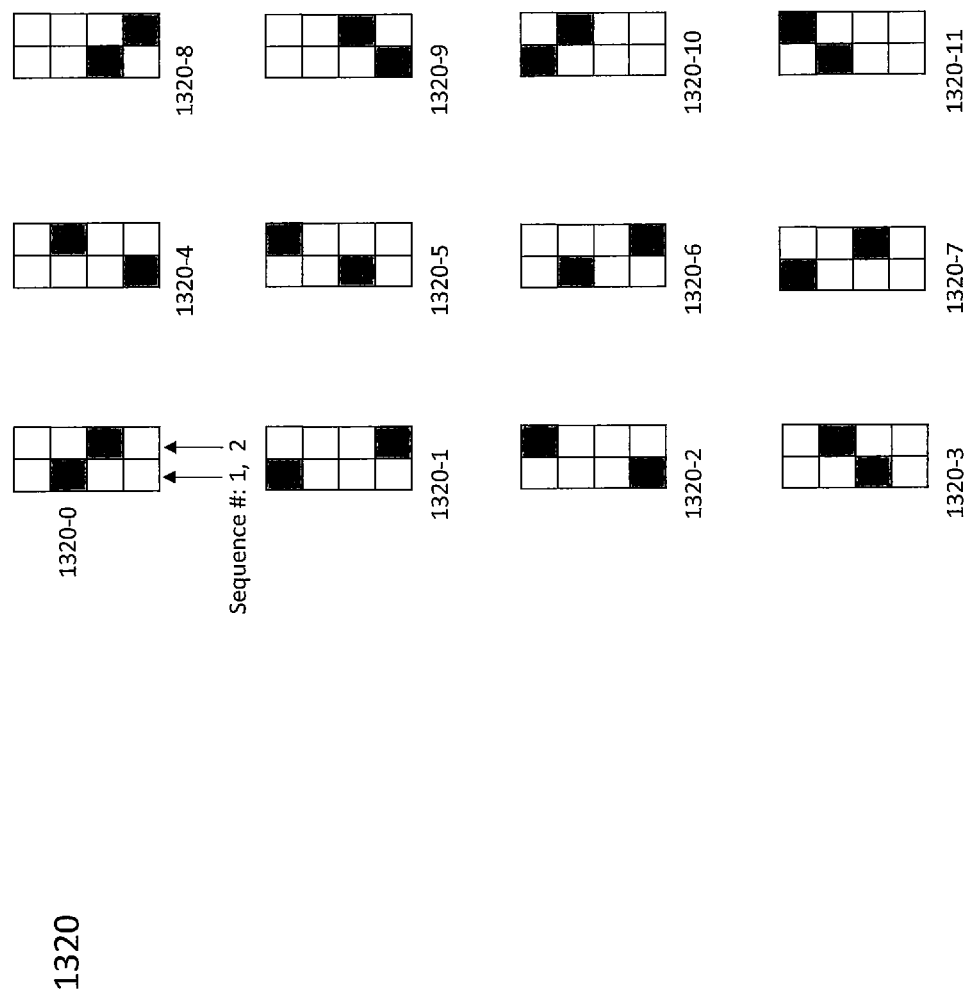
Figure 14A:
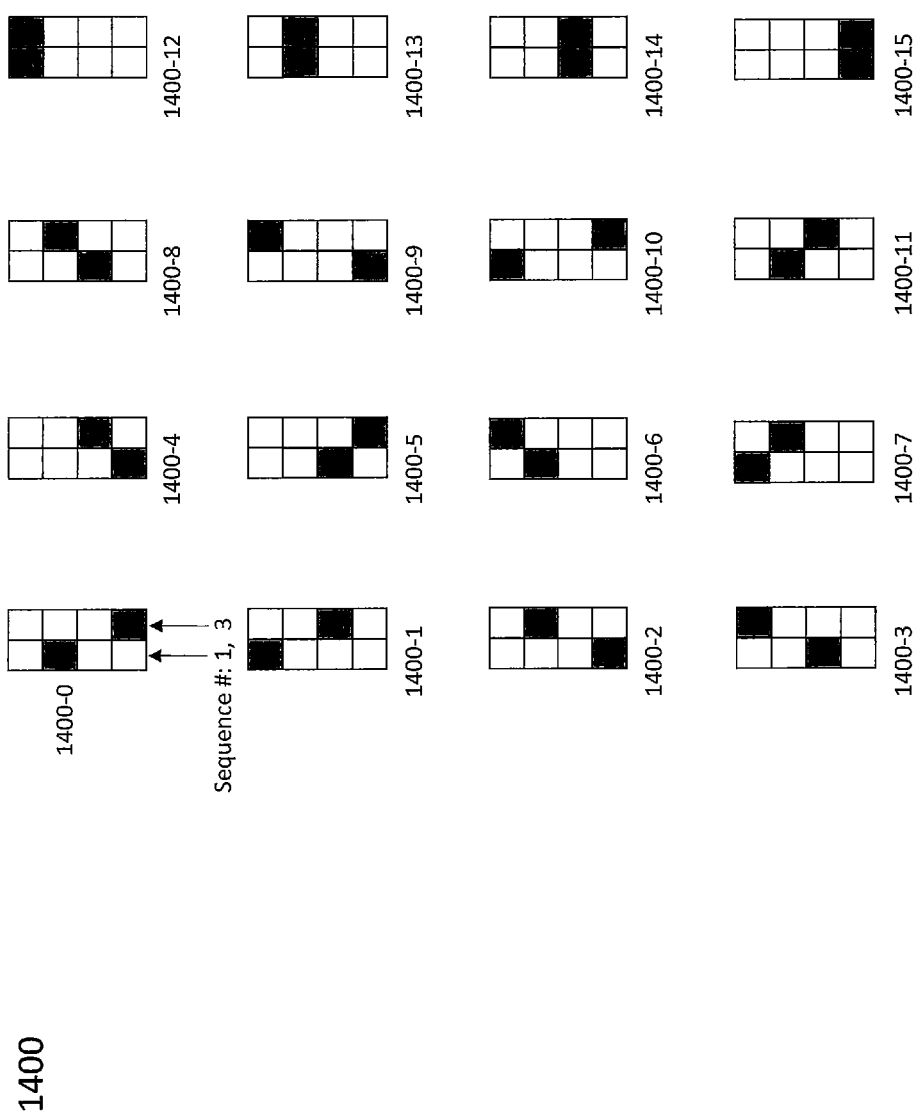
Figure 14B:
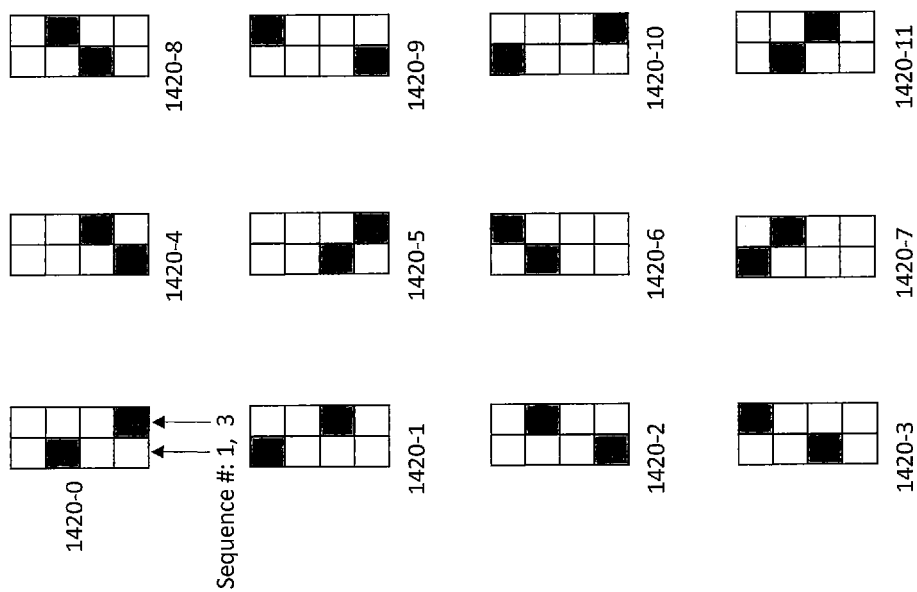
Figure 15A:
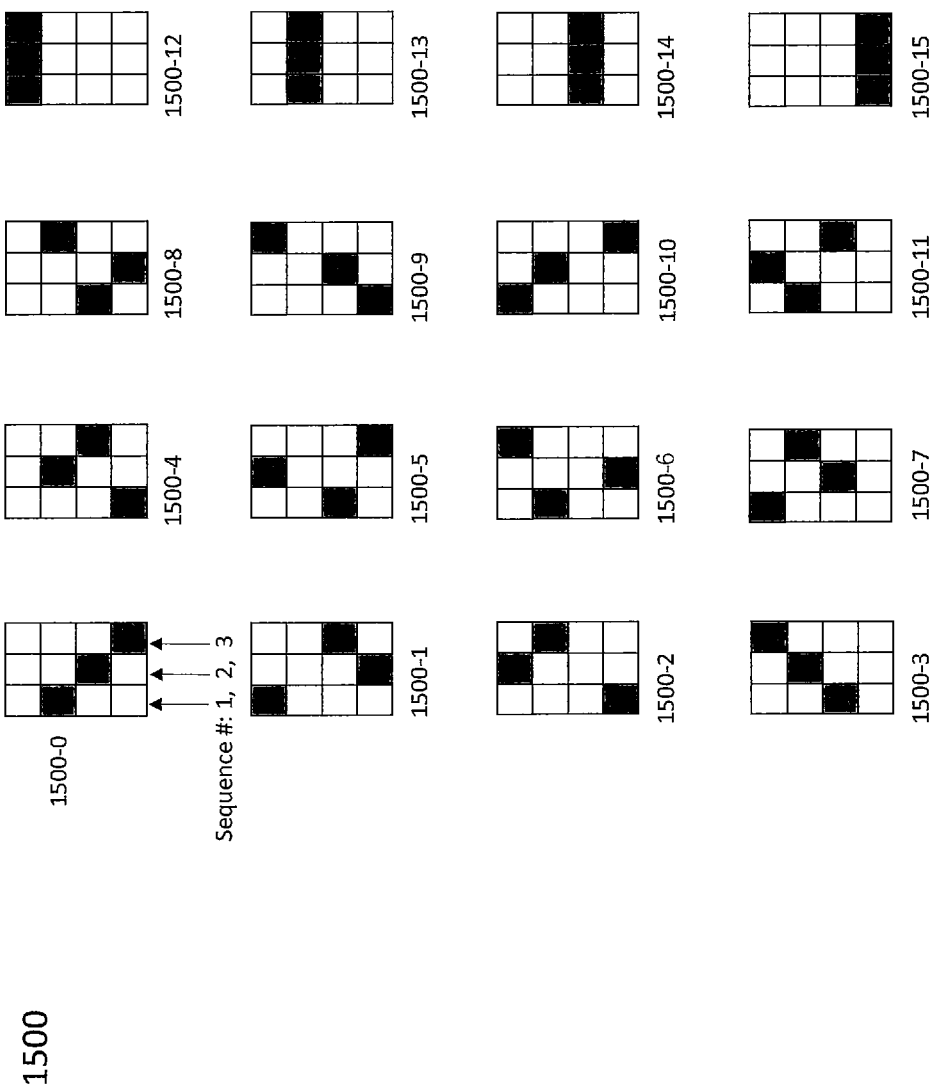
Figure 15B:
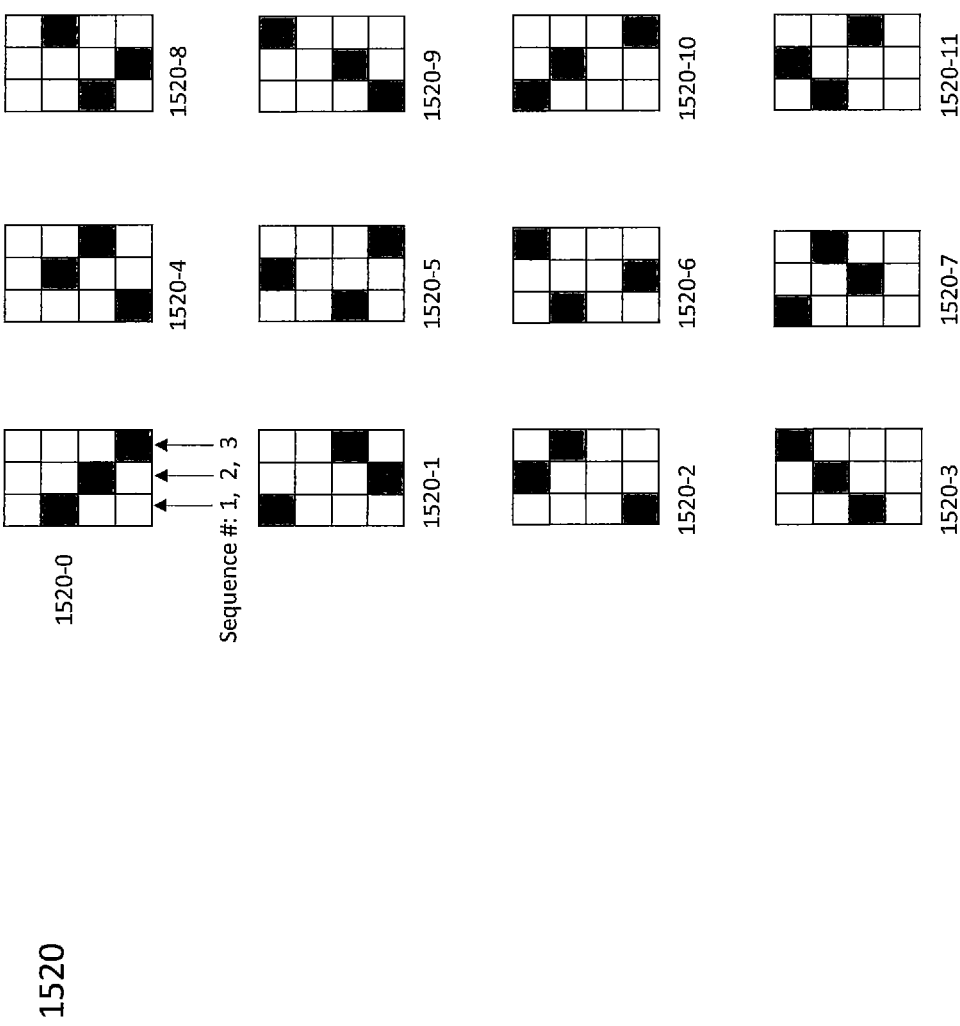
Figure 16A:
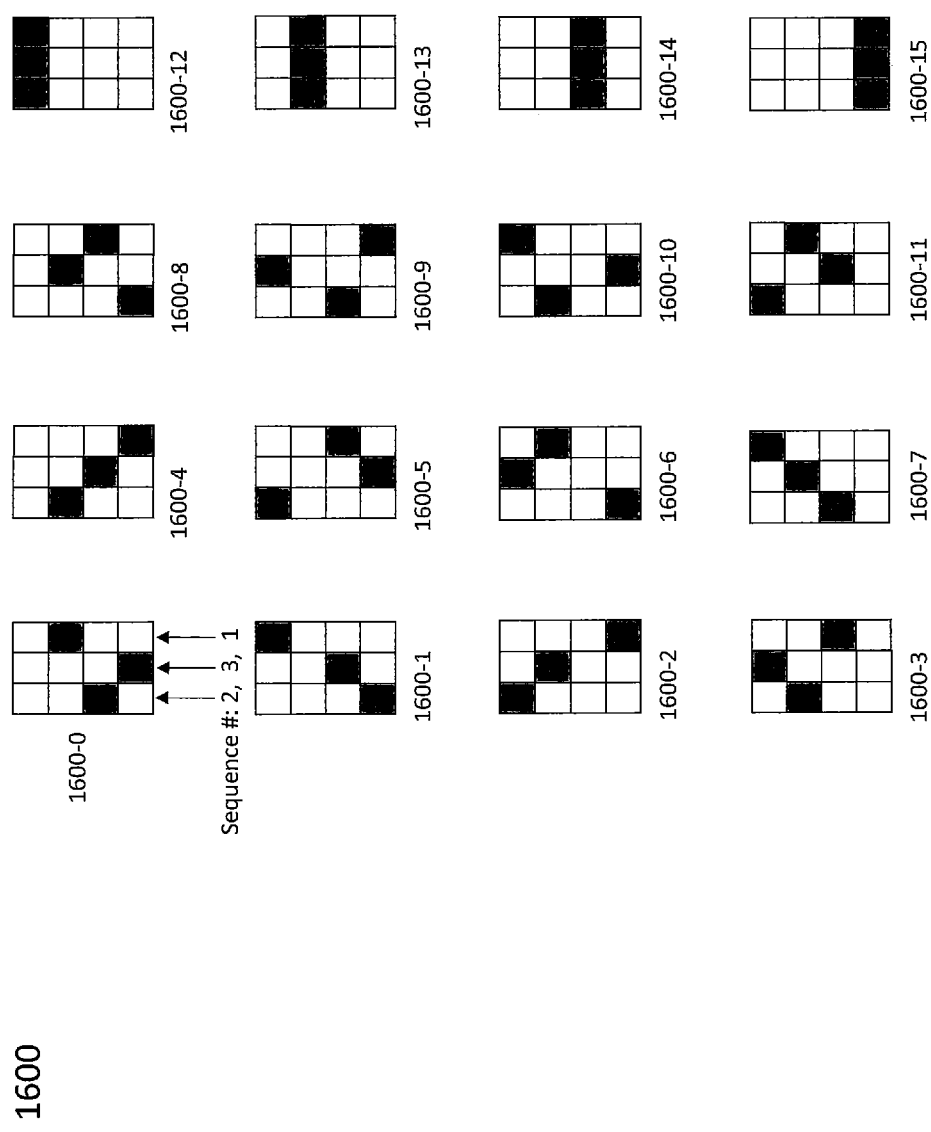
Figure 18:
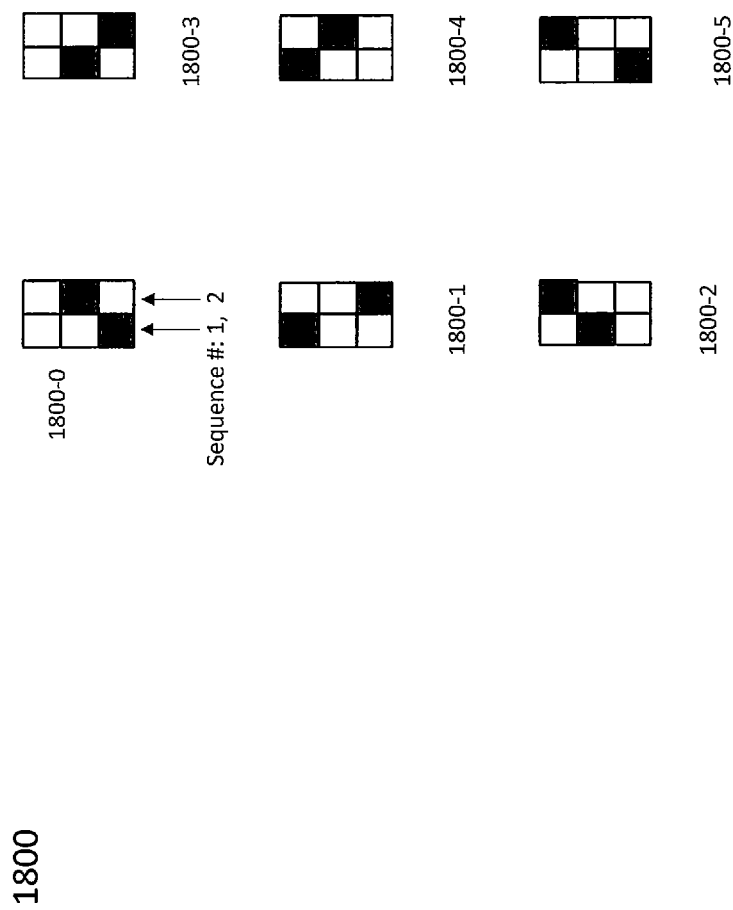

Continuing with the above example that each resource column is associated with a sequence # and based on the above-described shortening principle, FIG. 13A provides an exemplary set 1300 of updated resource hopping patterns that is generated by selecting two resource columns of each pre-defined resource hopping pattern in the set 300 of FIG. 3A (e.g., resource columns with sequences 1 and 2, respectively, in FIG. 3A) as respective updated resource columns of each updated resource hopping pattern in the set 1300; FIG. 13B provides an exemplary set 1320 of updated resource hopping patterns that is generated by selecting two resource columns of each pre-defined resource hopping pattern in the set 320 of FIG. 3B (e.g., resource columns with sequences 1 and 2, respectively, in FIG. 3B) as respective updated resource columns of each updated resource hopping pattern in the set 1320; FIG. 14A provides an exemplary set 1400 of updated resource hopping patterns that is generated by selecting two resource columns of each pre-defined resource hopping pattern in the set 300 of FIG. 3A (e.g., resource columns with sequences 1 and 3, respectively, in FIG. 3A) as respective updated resource columns of each updated resource hopping pattern in the set 1400; FIG. 14B provides an exemplary set 1420 of updated resource hopping patterns that is generated by selecting two resource columns of each pre-defined resource hopping pattern in the set 320 of FIG. 3B (e.g., resource columns with sequences 1 and 3, respectively, in FIG. 3B) as respective updated resource columns of each updated resource hopping pattern in the set 1420; FIG. 15A provides an exemplary set 1500 of updated resource hopping patterns that is generated by selecting three resource columns of each pre-defined resource hopping pattern in the set 300 of FIG. 3A (e.g., resource columns with sequences 1, 2, and 3, respectively, in FIG. 3A) as respective updated resource columns of each updated resource hopping pattern in the set 1500; FIG. 15B provides an exemplary set 1520 of updated resource hopping patterns that is generated by selecting two resource columns of each pre-defined resource hopping pattern in the set 320 of FIG. 3B (e.g., resource columns with sequences 1, 2, and 3, respectively, in FIG. 3B) as respective updated resource columns of each updated resource hopping pattern in the set 1520; FIG. 16A provides an exemplary set 1600 of updated resource hopping patterns that is generated by selecting three resource columns of each pre-defined resource hopping pattern in the set 300 of FIG. 3A (e.g., resource columns with sequences 1, 2, and 3, respectively, in FIG. 3A) and then shuffling the selected three resource columns (e.g., from sequence (1, 2, 3) to sequence (2, 3, 1)) to constitute respective updated resource columns of each updated resource hopping pattern in the set 1600; FIG. 16B provides an exemplary set 1620 of updated resource hopping patterns that is generated by selecting three resource columns of each pre-defined resource hopping pattern in the set 320 of FIG. 3B (e.g., resource columns with sequences 1, 2, and 3, respectively, in FIG. 3B) and then shuffling the selected three resource columns (e.g., from sequence (1, 2, 3) to sequence (2, 3, 1)) to constitute respective updated resource columns of each updated resource hopping pattern in the set 1620. FIG. 17 provides an exemplary set 1700 of updated resource hopping patterns that is generated by selecting three resource columns of each pre-defined resource hopping pattern in the set 340 of FIG. 3C (e.g., resource columns with sequences 1, 3, and 4, respectively, in FIG. 3C) and then shuffling the selected three resource columns (e.g., from sequence (1, 3, 4) to sequence (4, 3, 1)) to constitute respective resource columns of each updated resource hopping pattern in the set 1700; and FIG. 18 provides an exemplary set 1800 of updated resource hopping patterns that is generated by selecting two resource columns of each pre-defined resource hopping pattern in the set 360 of FIG. 3D (e.g., resource columns with sequences 1 and 2, respectively, in FIG. 3D) as respective updated resource columns of each updated resource hopping pattern in the set 1800.

Referring first to FIG. 13A, the set 1300 includes updated resource hopping patterns: 1300-0, 1300-1, 1300-2, 1300-3, 1300-4, 1300-5, 1300-6, 1300-7, 1300-8, 1300-9, 1300-10, 1300-11, 1300-12, 1300-13, 1300-14, and 1300-15. According to the above-described selection principle, the updated resource hopping pattern 1300-0 includes resource columns that are the resource columns with the sequences 1 and 2, respectively, selected from the pre-defined resource hopping pattern 300-0 of FIG. 3A. As such, the updated resource hopping pattern 1300-0 may have a time period of 2 that is "shortened" from the time period of the pre-defined resource hopping pattern 300-0, which is 4. Similarly, in some embodiments, each of the updated resource hopping patterns 1300-1 to 1300-15 of the set 1300 may follow the same principle to have respective "updated" resource columns. Each of updated resource hopping patterns: 1320-0, 1320-1, 1320-2, 1320-3, 1320-4, 1320-5, 1320-6, 1320-7, 1320-8, 1320-9, 1320-10, and 1320-11 in the set 1320 of FIG. 13B follow the same principle to have respective updated resource columns that are selected from the set 320 of FIG. 3B. Thus, corresponding discussions are not repeated here.

Referring then to FIG. 14A, the set 1400 includes updated resource hopping patterns: 1400-0, 1400-1, 1400-2, 1400-3, 1400-4, 1400-5, 1400-6, 1400-7, 1400-8, 1400-9, 1400-10, 1400-11, 1400-12, 1400-13, 1400-14, and 1400-15. According to the above-described selection principle, the updated resource hopping pattern 1400-0 includes resource columns that are the resource columns with the sequences 1 and 3, respectively, selected from the pre-defined resource hopping pattern 300-0 of FIG. 3A. As such, the updated resource hopping pattern 1400-0 may have a time period of 2 that is "shortened" from the time period of the pre-defined resource hopping pattern 300-0, which is 4. Similarly, in some embodiments, each of the updated resource hopping patterns 1400-1 to 1400-15 of the set 1400 may follow the same principle to have respective "updated" resource columns. Each of updated resource hopping patterns: 1420-0, 1420-1, 1420-2, 1420-3, 1420-4, 1420-5, 1420-6, 1420-7, 1420-8, 1420-9, 1420-10, and 1420-11 in the set 1420 of FIG. 14B follow the same principle to have respective updated resource columns that are selected from the set 320 of FIG. 3B. Thus, corresponding discussions are not repeated here.

Referring then to FIG. 15A, the set 1500 includes updated resource hopping patterns: 1500-0, 1500-1, 1500-2, 1500-3, 1500-4, 1500-5, 1500-6, 1500-7, 1500-8, 1500-9, 1500-10, 1500-11, 1500-12, 1500-13, 1500-14, and 1500-15. According to the above-described selection principle, the updated resource hopping pattern 1500-0 includes resource columns that are the resource columns with the sequences 1, 2, and 3, respectively, selected from the pre-defined resource hopping pattern 300-0 of FIG. 3A. As such, the updated resource hopping pattern 1500-0 may have a time period of 3 that is "shortened" from the time period of the pre-defined resource hopping pattern 300-0, which is 4. Similarly, in some embodiments, each of the updated resource hopping patterns 1500-1 to 1500-15 of the set 1500 may follow the same principle to have respective "updated" resource columns. Each of updated resource hopping patterns: 1520-0, 1520-1, 1520-2, 1520-3, 1520-4, 1520-5, 1520-6, 1520-7, 1520-8, 1520-9, 1520-10, and 1520-11 in the set 1520 of FIG. 15B follow the same principle to have respective updated resource columns that are selected from the set 320 of FIG. 3B. Thus, corresponding discussions are not repeated here.

Referring then to FIG. 16A, the set 1600 includes updated resource hopping patterns: 1600-0, 1600-1, 1600-2, 1600-3, 1600-4, 1600-5, 1600-6, 1600-7, 1600-8, 1600-9, 1600-10, 1600-11, 1600-12, 1600-13, 1600-14, and 1600-15. According to the above-described selection principle, the updated resource hopping pattern 1600-0 includes resource columns that are the resource columns with the sequences 1, 2, and 3, respectively, selected from the pre-defined resource hopping pattern 300-0 of FIG. 3A. And such three resource columns are further shuffled from sequence (1, 2, 3) to sequence (2, 3, 1) to constitute the respective resource columns of the updated resource hopping pattern 1600-0. As such, the updated resource hopping pattern 1600-0 may have a time period of 3 that is "shortened" from the time period of the pre-defined resource hopping pattern 300-0, which is 4. Similarly, in some embodiments, each of the updated resource hopping patterns 1600-1 to 1600-15 of the set 1600 may follow the same principle to have respective "updated" resource columns. Each of updated resource hopping patterns: 1620-0, 1620-1, 1620-2, 1620-3, 1620-4, 1620-5, 1620-6, 1620-7, 1620-8, 1620-9, 1620-10, and 1620-11 in the set 1620 of FIG. 16B follow the same principle to have respective updated resource columns that are selected, and then shuffled, from the set 320 of FIG. 3B. Thus, corresponding discussions are not repeated here.

Referring then to FIG. 17, the set 1700 includes updated resource hopping patterns: 1700-0, 1700-1, 1700-2, 1700-3, 1700-4, 1700-5, 1700-6, 1700-7, 1700-8, 1700-9, 1700-10, 1700-11, 1700-12, 1700-13, 1700-14, 1700-15, 1700-16, 1700-17, 1700-18, and 1700-19. According to the above-described selection principle, the updated resource hopping pattern 1700-0 includes resource columns that are the resource columns with the sequences 1, 3, and 4, respectively, selected from the pre-defined resource hopping pattern 340-0 of FIG. 3C. And such three resource columns are further shuffled from sequence (1, 3, 4) to sequence (4, 3, 1) to constitute the respective resource columns of the updated resource hopping pattern 1700-0. As such, the updated resource hopping pattern 1700-0 may have a time period of 3 that is "shortened" from the time period of the pre-defined resource hopping pattern 340-0, which is 5. Similarly, in some embodiments, each of the updated resource hopping patterns 1700-1 to 1700-19 of the set 1700 may follow the same principle to have respective "updated" resource columns.

Referring then to FIG. 18, the set 1800 includes updated resource hopping patterns: 1800-0, 1800-1, 1800-2, 1800-3, 1800-4, and 1800-5. According to the above-described selection principle, the updated resource hopping pattern 1800-0 includes resource columns that are the resource columns with the sequences 1 and 2, respectively, selected from the pre-defined resource hopping pattern 360-0 of FIG. 3D. As such, the updated resource hopping pattern 1800-0 may have a time period of 2 that is "shortened" from the time period of the pre-defined resource hopping pattern 360-0, which is 3. Similarly, in some embodiments, each of the updated resource hopping patterns 1800-1 to 1800-5 of the set 1800 may follow the same principle to have respective "updated" resource columns.

Symbolic Illustration of Permutation

Figure 19A:
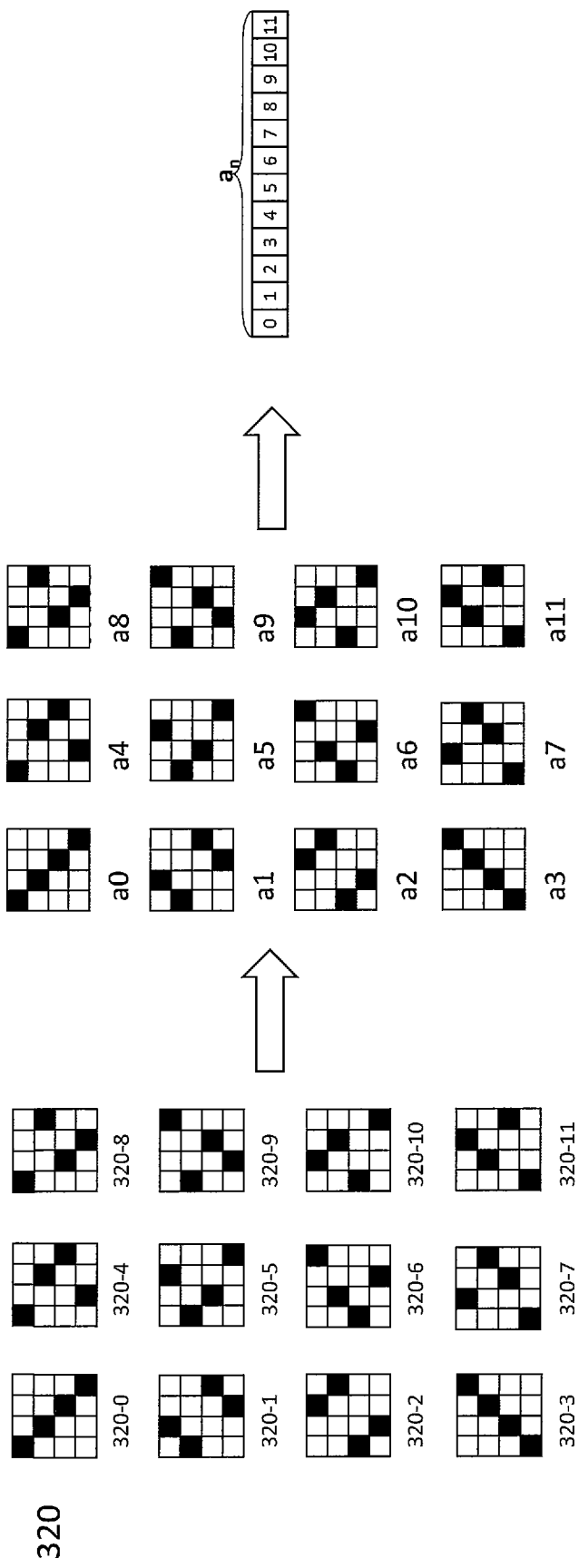

Referring first to FIG. 19A, the set 320 of FIG. 3B, for example, is selected to be modified by the disclosed elongating method. For purposes of clarity of illustration, each of the pre-defined resource hopping patterns in the set 320 is re-numbered by its respective pattern # (n). As shown, the pre-defined resource hopping pattern 320-0 is herein referred to as pre-defined resource hopping pattern a0; the pre-defined resource hopping pattern 320-1 is herein referred to as pre-defined resource hopping pattern a1; the pre-defined resource hopping pattern 320-2 is herein referred to as pre-defined resource hopping pattern a2; the pre-defined resource hopping pattern 320-3 is herein referred to as pre-defined resource hopping pattern a3; the pre-defined resource hopping pattern 320-4 is herein referred to as pre-defined resource hopping pattern a4; the pre-defined resource hopping pattern 320-5 is herein referred to as pre-defined resource hopping pattern a5; the pre-defined resource hopping pattern 320-6 is herein referred to as pre-defined resource hopping pattern a6; the pre-defined resource hopping pattern 320-7 is herein referred to as pre-defined resource hopping pattern a7; the pre-defined resource hopping pattern 320-8 is herein referred to as pre-defined resource hopping pattern a8; the pre-defined resource hopping pattern 320-9 is herein referred to as pre-defined resource hopping pattern a9; the pre-defined resource hopping pattern 320-10 is herein referred to as pre-defined resource hopping pattern a10; and the pre-defined resource hopping pattern 320-11 is herein referred to as pre-defined resource hopping pattern a11. And also as shown in FIG. 19A, the set 320 is symbolically expressed as "$a_n$." Although an is arranged as a single-row configuration, it is understood such a configuration is for purposes of illustration and is one example of various column-row configurations of the set 320.

Figure 19B:
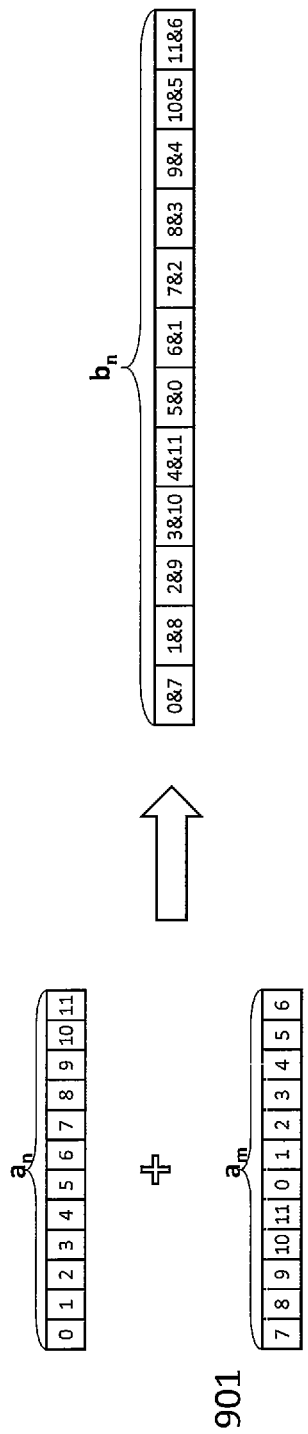

In accordance with the permutation of mod (n+d, N), FIG. 19B illustrates an example to generate a set of updated resource hopping pattern "$b_n$" by coupling "$a_m$ (901)" to $a_n$, wherein $a_m$ and $a_n$ may correspond to a set constituted by the aforementioned "second" pre-defined resource hopping patterns and a set constituted by the aforementioned "first" pre-defined resource hopping patterns, respectively. As shown, a respective pattern # within the set $a_m$ is changed to {7, 8, 9, 10, 11, 0, 1, 2, 3, 4, 5, 6} when a permutation mod(n+7, 12) is used. In some embodiments, the set $b_n$ is generated by coupling $a_m$ to $a_n$, which has respective pattern # arranged as {0&7, 1&8, 2&9, 3&10, 4&11, 5&0, 6&1, 7&2, 8&3, 9&4, 10&5, 11&6}.

In accordance with the permutation of mod (n×w+g(n), N), FIG. 19C provides various examples 903, 905, 907, 909, and 911 of the set $a_m$ that are each generated based on the set $a_n$ of FIG. 19A (i.e., N=12). In particular, when w=2 (not coprime with 12), the value of m is determined by equations shown in 903 wherein g(n) varies with the value of n; when w=3 (not coprime with 12), the value of m is determined by equations shown in 905 wherein g(n) varies with the value of n; when w=4 (not coprime with 12), the value of m is determined by equations shown in 907 wherein g(n) varies with the value of n; when w=5 (coprime with 12), the value of m is determined by equations shown in 909 wherein g(n) is a constant (i.e., not varying with the value of n); and when w=7 (coprime with 12), the value of m is determined by equations shown in 911 wherein g(n) is a constant (i.e., not varying with the value of n).

Figure 19D:
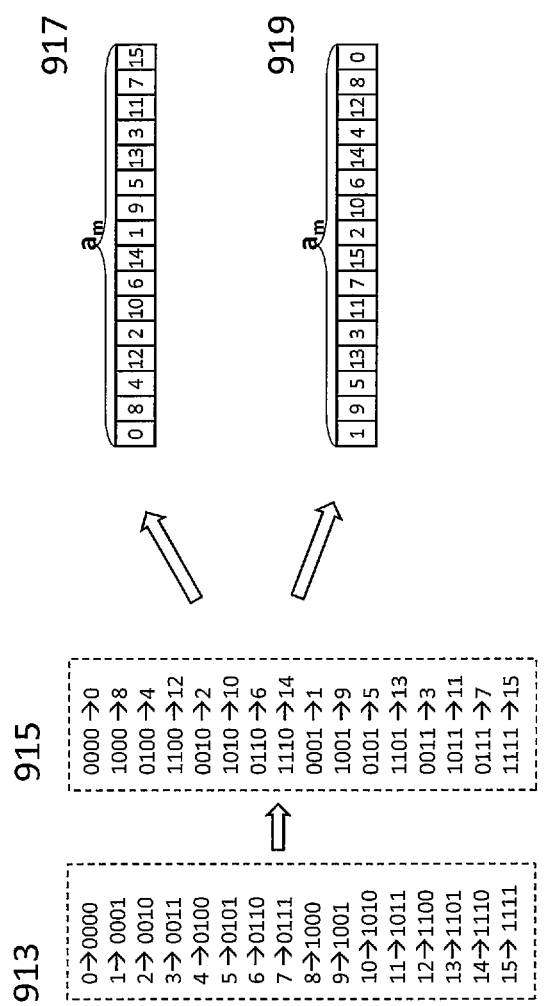

In accordance with the permutation of m=mod (BRO (n)+d, N), FIG. 19D provides various examples 917 and 919 of the set $a_m$ that are each generated based on the set $a_n$ of FIG. 19A (i.e., N=16). Each pattern # of the set $a_n$ is converted into a respective combination of 4 binary bits, which is shown in 913, and each combination of 4 binary bits is reversed in order by the BRO function and then converted back to a respective decimal number, which is shown in 915. In particular, the example 917 shows the set $a_m$ (and respective m values) when d=0, the; and the example 919 shows the set $a_m$ (and respective m values) when d=1.

Embodiments of Assigning Resource Units

The above discussions are directed to how an updated resource hopping pattern is generated from a corresponding pre-defined resource hopping pattern. As described above, the UE 104 is assigned with a respective updated resource hopping pattern, which contains a respective set of assigned resource units, to transmit uplink signal(s). In some embodiments, the UE 104 may receive instruction(s), from the BS 102, indicative of such a set of assigned resource units. Various embodiments of such instructions are respectively discussed below.

In an embodiment, a plurality of sets of updated resource hopping patterns ($A_1, A_2, A_3, \ldots, A_M$), generated by a set of pre-defined resource hopping patterns (Z), have been already known by the BS 102 and UE 104 through a higher-level instruction or protocol. As such, when the UE 104 camps on the cell of the BS 102, the BS 102 may let the UE 104 know which updated resource hopping pattern among the plurality of sets of updated resource hopping patterns can be used by the UE 104 through a 2-level instruction. More specifically, the BS 102 first instructs which of the sets among ($A_1, A_2, A_3, \ldots, A_M$) is assigned to the UE 104 by sending an index m that is selected from 1, 2, ..., M, and then which updated resource hopping pattern within the set associated with the index m by sending a pattern index n (e.g., a pattern # as described above).

In another embodiment, a set of pre-defined resource hopping patterns has been already known by the BS 102 and UE 104 through a higher-level instruction or protocol. When the UE 104 camps on the cell of the BS 102, the BS 102 may instruct the UE 104 which of the elongating, rearranging, and shortening methods, as mentioned above, to be used. Based on the instruction, the UE 104 generates a respective set of updated resource hopping patterns. Accordingly, the UE 104 may select one from one from the set of updated resource hopping patterns for use, or wait for further instruction from the BS 102 to indicate which of the updated resource hopping patterns among the set is assigned to the UE 104.

In yet another embodiment, a set of pre-defined resource hopping patterns has been already known by the BS 102 and UE 104 through a higher-level instruction or protocol. When the UE 104 camps on the cell of the BS 102, the BS 102 may instruct the UE 104 plural parameters (e.g., pattern # (n), the offset of pattern columns (k), the offset of pattern rows ($l_j$), etc.) of the above-mentioned resource hopping equation ($b_n(t)$) to allow the UE 104 to generate a respective updated resource hopping pattern.

In yet another embodiment, a plurality of pre-defined resource hopping patterns ($Z_1, Z_2, Z_3$, etc.) have been already known by the BS 102 and UE 104 through a higher-level instruction or protocol. And respective plural sets of updated resource hopping patterns are generated by each set pre-defined resource hopping pattern. For example, a plurality of sets of updated resource hopping patterns ($A_{11}, A_{21}, A_{31}, \ldots, A_{M1}$) are generated from the pre-defined resource hopping pattern $Z_1$; a plurality of sets of updated resource hopping patterns ($A_{12}, A_{22}, A_{32}, \ldots, A_{M2}$) are generated from the pre-defined resource hopping pattern $Z_2$; a plurality of sets of updated resource hopping patterns ($A_{13}, A_{23}, A_{33}, \ldots, A_{M3}$) are generated from the pre-defined resource hopping pattern $Z_3$. In some embodiments, the respective plural sets of updated resource hopping patterns ($A_{11}, A_{21}, A_{31}, \ldots, A_{M1}; A_{12}, A_{22}, A_{32}, \ldots, A_{M2}; A_{13}, A_{23}, A_{33}, \ldots, A_{M3}$) are re-referenced by $B_1, B_2, B_3, \ldots, B_{M1+M2+M3}$, which may have been already known by the BS 102 and UE 104 through the higher-level instruction or protocol as well.

As such, when the UE 104 camps on the cell of the BS 102, the BS 102 may let the UE 104 know which updated resource hopping pattern among the plurality of sets of updated resource hopping patterns can be used by the UE 104 through a 2-level instruction. More specifically, the BS 102 first instructs which of the sets among ($B_1, B_2, B_3, \ldots, B_{M1+M2+M3}$) is assigned to the UE 104 by sending an index m that is selected from 1, 2, ..., $M_1+M_2+M_3$, and then which updated resource hopping pattern within the set associated with the index m by sending a pattern index n (e.g., a pattern # as described above).

In yet another embodiment, plural sets of pre-defined resource hopping patterns have been already known by the BS 102 and UE 104 through a higher-level instruction or protocol. When the UE 104 camps on the cell of the BS 102, the BS 102 may instruct the UE 104 which of the elongating, rearranging, and shortening methods, as mentioned above, to be used. Based on the instruction, the UE 104 generates a respective set of updated resource hopping patterns. Accordingly, the UE 104 may select one from one from the set of updated resource hopping patterns for use, or wait for further instruction from the BS 102 to indicate which of the updated resource hopping patterns among the set is assigned to the UE 104.

As discussed above, the respective assigned resource units may be instructed, e.g., by the BS 102, to a communication node, e.g., the UE 104, by using a resource hopping pattern, a resource hopping equation, and/or a resource hopping table. Thus, such resource hopping instructions may be collectively referred to as "resource hopping rules," in accordance with some embodiments of the present disclosure.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
  transmitting a resource allocation signal to a communication node, the resource allocation signal indicating an updated resource hopping rule for the communication node to transmit a signal, wherein the updated resource hopping rule is derived based on an initial resource hopping rule by adjusting a time period defined by the initial resource hopping rule, wherein the initial resource hopping rule defines a plurality of initial resource hopping patterns that are arranged in a column-row configuration, and wherein the updated resource hopping rule defines a second updated resource hopping pattern as a portion of a first one of the plurality of initial resource hopping patterns, and wherein the second updated resource hopping pattern has fewer resource columns than the first one of the plurality of initial resource hopping patterns.

2. The method of claim 1, wherein the updated resource hopping rule defines a first updated resource hopping pattern as a combination, along a time domain, of a second one and a third one of the plurality of initial resource hopping patterns.

3. The method of claim 2, wherein the second one and the third one are arranged along a same pattern row of the column-row configuration.

4. The method of claim 2, wherein the second one and the third one are arranged along a same pattern column of the column-row configuration.

5. The method of claim 2, wherein the second one is arranged at an intersection of a first pattern column and a first pattern row and the third one is arranged at an intersection of a second pattern column and a second pattern row, and wherein the first pattern column is different from the second pattern column and the first pattern row is different from the second pattern row.

6. The method of claim 2, wherein the second one is associated with a first pattern index and the third one is associated with a second pattern index, and wherein the second pattern index is a permutation of the first pattern index.

7. A method, comprising:
receiving, by a communication node, a resource allocation signal indicating an updated resource hopping rule for the communication node to transmit a signal, wherein the updated resource hopping rule is derived based on an initial resource hopping rule by adjusting a time period defined by the initial resource hopping rule, wherein the initial resource hopping rule defines a plurality of initial resource hopping patterns that are arranged in a column-row configuration, and wherein the updated resource hopping rule defines a second updated resource hopping pattern as a portion of a first one of the plurality of initial resource hopping patterns, and wherein the second updated resource hopping pattern has fewer resource columns than the first one of the plurality of initial resource hopping patterns.

8. The method of claim 7, wherein the updated resource hopping rule defines a first updated resource hopping pattern as a combination, along a time domain, of a second one and a third one of the plurality of initial resource hopping patterns.

9. The method of claim 8, wherein the second one and the third one are arranged along a same pattern row of the column-row configuration.

10. The method of claim 8, wherein the second one and the third one are arranged along a same pattern column of the column-row configuration.

11. The method of claim 8, wherein the second one is arranged at an intersection of a first pattern column and a first pattern row and the third one is arranged at an intersection of a second pattern column and a second pattern row, and wherein the first pattern column is different from the second pattern column and the first pattern row is different from the second pattern row.

12. The method of claim 8, wherein the second one is associated with a first pattern index and the third one is associated with a second pattern index, and wherein the second pattern index is a permutation of the first pattern index.

13. A wireless communication node, comprising a transceiver configured to carry out the method of claim 7.

14. The wireless communication node of claim 13, wherein the updated resource hopping rule defines a first updated resource hopping pattern as a combination, along a time domain, of a second one and a third one of the plurality of initial resource hopping patterns.

15. The wireless communication node of claim 14, wherein the second one and the third one are arranged along a same pattern row of the column-row configuration.

16. The wireless communication node of claim 14, wherein the second one and the third one are arranged along a same pattern column of the column-row configuration.

17. A wireless communication device, comprising:
a transceiver configured to transmit a resource allocation signal to a communication node, the resource allocation signal indicating an updated resource hopping rule for the communication node to transmit a signal, wherein the updated resource hopping rule is derived based on an initial resource hopping rule by adjusting a time period defined by the initial resource hopping rule, wherein the initial resource hopping rule defines a plurality of initial resource hopping patterns that are arranged in a column-row configuration, and wherein the updated resource hopping rule defines a second updated resource hopping pattern as a portion of a first one of the plurality of initial resource hopping patterns, and wherein the second updated resource hopping pattern has fewer resource columns than the first one of the plurality of initial resource hopping patterns.

18. The wireless communication device of claim 17, wherein the updated resource hopping rule defines a first updated resource hopping pattern as a combination, along a time domain, of a second one and a third one of the plurality of initial resource hopping patterns.

19. The wireless communication device of claim 18, wherein the second one and the third one are arranged along a same pattern row of the column-row configuration.

20. The wireless communication device of claim 18, wherein the second one and the third one are arranged along a same pattern column of the column-row configuration.

* * * * *